United States Patent
Gutman et al.

(10) Patent No.: US 11,515,953 B1
(45) Date of Patent: Nov. 29, 2022

(54) LOW NOISE AMPLIFIER SATURATION MITIGATION

(71) Applicant: QUALCOMM Incorporated, San Diego, CA (US)

(72) Inventors: Igor Gutman, Hod HaSharon (IL); Navid Abedini, Basking Ridge, NJ (US); Peter Gaal, San Diego, CA (US); Tao Luo, San Diego, CA (US); Junyi Li, Fairless Hills, PA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/395,290

(22) Filed: Aug. 5, 2021

(51) Int. Cl.
*H04B 17/24* (2015.01)
*H04L 5/14* (2006.01)
*H04B 1/10* (2006.01)

(52) U.S. Cl.
CPC .............. *H04B 17/24* (2015.01); *H04B 1/10* (2013.01); *H04L 5/14* (2013.01)

(58) Field of Classification Search
CPC . H04W 74/0825; H04W 24/10; H04W 88/14; H04B 17/336
See application file for complete search history.

(56) References Cited

U.S. PATENT DOCUMENTS

| | | | |
|---|---|---|---|
| 2013/0181180 A1* | 7/2013 | Tada | H01L 27/101 257/1 |
| 2015/0156003 A1* | 6/2015 | Khandani | H04L 5/143 370/278 |
| 2016/0100433 A1* | 4/2016 | Vajapeyam | H04W 74/0816 370/329 |
| 2018/0145774 A1* | 5/2018 | Jang | H04W 48/20 |
| 2019/0327070 A1* | 10/2019 | Jung | H04B 1/123 |
| 2020/0351690 A1* | 11/2020 | Zhu | H04L 5/0094 |

* cited by examiner

*Primary Examiner* — Tejis Daya
(74) *Attorney, Agent, or Firm* — Terry Tsai

(57) ABSTRACT

Methods, systems, and devices for wireless communications are described. A user equipment (UE) may receive signaling from a base station and may pass the signaling through one or more low noise amplifiers (LNAs) at a receiver of the UE. The UE may determine a saturation threshold at the one or more LNAs is exceeded. The UE may transmit an indication to the base station that the saturation threshold is exceeded. The base station may send additional signaling to the UE whose content, schedule, or configuration is responsive to the indication that the saturation threshold is exceeded. The UE may process the additional signaling using a digital linearizer at a receive chain of the UE. A base station may indicate an LNA saturation state to a UE in advance. The UE may respond to the indication (e.g., by setting LNA and digital linearizer states to accommodate predicted saturation).

30 Claims, 17 Drawing Sheets

LOW NOISE AMPLIFIER SATURATION MITIGATION

FIELD OF TECHNOLOGY

The following relates to wireless communications, including low noise amplifier (LNA) saturation mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support low noise amplifier saturation mitigation. Generally, the described techniques provide for a user equipment (UE) to transmit an indication that a saturation threshold is exceeded at one or more low noise amplifiers (LNAs) to a base station. In some cases, a UE may receive signaling from a base station and may pass the signaling through one or more LNAs at a receiver of the UE. The UE may determine a saturation threshold at the one or more LNAs is exceeded based on a non-linearity of the output of the LNAs. The UE may transmit an indication to the base station that the saturation threshold is exceeded, and may process additional signaling according to a content, schedule, or configuration to avoid the saturation threshold being exceeded at the LNAs. For example, the UE may process the additional signaling using a digital linearizer of a receive chain of the UE, according to an LNA state, a digital linearizer state, or both, or according to a mobility of the UE.

A method for wireless communications at a UE is described. The method may include receiving signaling from a base station, the signaling passing through one or more LNAs at the UE, determining that a saturation threshold is exceeded during processing of the signaling by the one or more LNAs at the UE, transmitting, to the base station, an indication that the saturation threshold is exceeded, and receiving additional signaling from the base station whose content, schedule, or configuration is responsive to the indication that the saturation threshold is exceeded.

An apparatus for wireless communications at a UE is described. The apparatus may include a processor, memory coupled with the processor, and instructions stored in the memory. The instructions may be executable by the processor to cause the apparatus to receive signaling from a base station, the signaling passing through one or more LNAs at the UE, determine that a saturation threshold is exceeded during processing of the signaling by the one or more LNAs at the UE, transmit, to the base station, an indication that the saturation threshold is exceeded, and receive additional signaling from the base station whose content, schedule, or configuration is responsive to the indication that the saturation threshold is exceeded.

Another apparatus for wireless communications at a UE is described. The apparatus may include means for receiving signaling from a base station, the signaling passing through one or more LNAs at the UE, means for determining that a saturation threshold is exceeded during processing of the signaling by the one or more LNAs at the UE, means for transmitting, to the base station, an indication that the saturation threshold is exceeded, and means for receiving additional signaling from the base station whose content, schedule, or configuration is responsive to the indication that the saturation threshold is exceeded.

A non-transitory computer-readable medium storing code for wireless communications at a UE is described. The code may include instructions executable by a processor to receive signaling from a base station, the signaling passing through one or more LNAs at the UE, determine that a saturation threshold is exceeded during processing of the signaling by the one or more LNAs at the UE, transmit, to the base station, an indication that the saturation threshold is exceeded, and receive additional signaling from the base station whose content, schedule, or configuration is responsive to the indication that the saturation threshold is exceeded.

Some examples of the method, apparatuses, and non-transitory computer-readable medium described herein may further include operations, features, means, or instructions for processing the additional signaling using a digital linearizer of a receive chain of the UE.

Some examples of the method, apparatuses, and non-transitory computer-readable medium described herein may further include operations, features, means, or instructions for measuring a level of self-interference arising from full duplex communications while the UE was receiving the signaling and transmitting, to the base station, information that may be indicative of one or more pairs of receive beams and transmit beams on which the UE was communicating when determining that the saturation threshold had been exceeded.

In some examples of the method, apparatuses, and non-transitory computer-readable medium described herein, transmitting the indication that the saturation threshold may be exceeded may include operations, features, means, or instructions for transmitting information that may be indicative of a receive beam used to receive the signaling, a receive array used to receive the signaling, a transmit beam used during full duplex communications while the UE was receiving the signaling, a transmit array identifier used during full duplex communications while the UE was receiving the signaling, a saturation level of the one or more LNAs, one or more resources during which the saturation threshold was exceeded, or a combination thereof.

Some examples of the method, apparatuses, and non-transitory computer-readable medium described herein may further include operations, features, means, or instructions for receiving, from the base station, a message indicating that one or more conditions that previously resulted in the saturation threshold being exceeded during processing of the signaling by the one or more LNAs at the UE may be scheduled to repeat.

In some examples of the method, apparatuses, and non-transitory computer-readable medium described herein, receiving the message may include operations, features, means, or instructions for receiving the message via a flag in a downlink control information (DCI) message, a radio resource control (RRC) message, a media access control (MAC) control element (CE), or a sidelink broadcast message.

In some examples of the method, apparatuses, and non-transitory computer-readable medium described herein, the message includes at least one of a state identifier associated with the one or more conditions, time or frequency resource identifiers associated with resources on which an aggressor UE may be scheduled to transmit, location or direction information about the aggressor UE, or a level or severity of interference or saturation expected to be caused by the aggressor UE.

In some examples of the method, apparatuses, and non-transitory computer-readable medium described herein, the one or more conditions with which the state identifier may be associated include combinations of one or more measurement resources, measurement objects, reporting objects, a receive beam on which the UE was communicating when determining that the saturation threshold had been exceeded, or a transfer beam on which the UE was communicating when determining that the saturation threshold had been exceeded.

Some examples of the method, apparatuses, and non-transitory computer-readable medium described herein may further include operations, features, means, or instructions for setting an LNA state for the one or more LNAs at the UE based on receiving the message, setting a digital linearizer state of a receive chain of the UE based on receiving the message, and processing the additional signaling in accordance with the LNA state and the digital linearizer state.

Some examples of the method, apparatuses, and non-transitory computer-readable medium described herein may further include operations, features, means, or instructions for determining a mobility of the UE and transmitting, to the base station, an indication that a state identifier associated with the one or more conditions may be to be cleared, continued, or updated based on the mobility of the UE.

In some examples of the method, apparatuses, and non-transitory computer-readable medium described herein, searching, in response to receiving the message, for one or more beams or cells that may be not associated with the one or more conditions that may be scheduled to repeat.

Some examples of the method, apparatuses, and non-transitory computer-readable medium described herein may further include operations, features, means, or instructions for transmitting, to one or more wireless devices and in response to receiving the message, a notification that may be indicative that the saturation threshold may be expected to be exceeded during processing of the additional signaling.

Some examples of the method, apparatuses, and non-transitory computer-readable medium described herein may further include operations, features, means, or instructions for alerting a user of the UE, in response to receiving the message, that wireless communications of the UE may be adversely affected due to the one or more conditions.

In some examples of the method, apparatuses, and non-transitory computer-readable medium described herein, transmitting the indication may include operations, features, means, or instructions for transmitting the indication in association with a quasi-colocation type reserved for use by UEs having LNAs operating in a non-linearity state.

Some examples of the method, apparatuses, and non-transitory computer-readable medium described herein may further include operations, features, means, or instructions for measuring a level of self-interference arising from full duplex communications while the UE was receiving the signaling, setting an LNA state for the one or more LNAs at the UE based on the level of self-interference, setting a digital linearizer state for a digital linearizer at a digital front end of a receive chain of the UE based on the level of self-interference, and processing the additional signaling in accordance with the LNA state and the digital linearizer state.

A method for wireless communications at a base station is described. The method may include transmitting signaling to a UE, receiving, from the UE, an indication that a saturation threshold was exceeded during processing of the signaling by one or more LNAs at the UE, and transmitting additional signaling to the UE, where at least one of a content, schedule, or configuration of the additional signaling is responsive to the indication that the saturation threshold was exceeded.

An apparatus for wireless communications at a base station is described. The apparatus may include a processor, memory coupled with the processor, and instructions stored in the memory. The instructions may be executable by the processor to cause the apparatus to transmit signaling to a UE, receive, from the UE, an indication that a saturation threshold was exceeded during processing of the signaling by one or more LNAs at the UE, and transmit additional signaling to the UE, where at least one of a content, schedule, or configuration of the additional signaling is responsive to the indication that the saturation threshold was exceeded.

Another apparatus for wireless communications at a base station is described. The apparatus may include means for transmitting signaling to a UE, means for receiving, from the UE, an indication that a saturation threshold was exceeded during processing of the signaling by one or more LNAs at the UE, and means for transmitting additional signaling to the UE, where at least one of a content, schedule, or configuration of the additional signaling is responsive to the indication that the saturation threshold was exceeded.

A non-transitory computer-readable medium storing code for wireless communications at a base station is described. The code may include instructions executable by a processor to transmit signaling to a UE, receive, from the UE, an indication that a saturation threshold was exceeded during processing of the signaling by one or more LNAs at the UE, and transmit additional signaling to the UE, where at least one of a content, schedule, or configuration of the additional signaling is responsive to the indication that the saturation threshold was exceeded.

Some examples of the method, apparatuses, and non-transitory computer-readable medium described herein may further include operations, features, means, or instructions for receiving, from the UE, information that may be indicative of one or more pairs of receive beams and transmit beams on which the UE was communicating when determining that the saturation threshold had been exceeded.

In some examples of the method, apparatuses, and non-transitory computer-readable medium described herein, receiving the indication that the saturation threshold may be exceeded may include operations, features, means, or instructions for receiving information that may be indicative of a receive beam used by the UE to receive the signaling, a receive array used by the UE to receive the signaling, a transmit beam used by the UE during full duplex communications while the UE was receiving the signaling, a transmit array identifier used by the UE during full duplex communications while the UE was receiving the signaling, a saturation level of the one or more LNAs, one or more resources during which the saturation threshold was exceeded, or a combination thereof.

Some examples of the method, apparatuses, and non-transitory computer-readable medium described herein may further include operations, features, means, or instructions for determining, based on the indication received from the UE that the saturation threshold had been exceeded during processing by the UE of the signaling, one or more conditions that contributed to the saturation threshold being exceeded and associating the one or more conditions with a state identifier.

In some examples of the method, apparatuses, and non-transitory computer-readable medium described herein, the state identifier may be associated with a cross interference level at the UE, a transmit beam used during full duplex communications by the UE, a transmit power used during full duplex communications by the UE, a transmit bandwidth used during full duplex communications by the UE, a transmit timing used during full duplex communications by the UE, a receive beam used by the UE to receive the signaling, a self-interference level caused by full duplex communications at the UE, location information corresponding to the UE, mobility information corresponding to the UE, resources corresponding to the exceeded saturation threshold, or a combination thereof In some examples of the method, apparatuses, and non-transitory computer-readable medium described herein, transmitting the additional signaling may include operations, features, means, or instructions for modifying at least one of the content, schedule, or configuration of the additional signaling based on the state identifier so as to avoid at least a portion of the one or more conditions.

Some examples of the method, apparatuses, and non-transitory computer-readable medium described herein may further include operations, features, means, or instructions for transmitting, to a network entity, a message indicating the state identifier and coordinating with the network entity to avoid at least a portion of the one or more conditions.

Some examples of the method, apparatuses, and non-transitory computer-readable medium described herein may further include operations, features, means, or instructions for transmitting, to the UE, a message indicating that the one or more conditions that previously resulted in the saturation threshold being exceeded during processing of the signaling by the one or more LNAs at the UE may be scheduled to repeat.

In some examples of the method, apparatuses, and non-transitory computer-readable medium described herein, transmitting the message may include operations, features, means, or instructions for transmitting the message via a flag in a DCI message, an RRC message, a MAC-CE, or a sidelink broadcast message.

In some examples of the method, apparatuses, and non-transitory computer-readable medium described herein, the message includes one or more of the state identifier, time or frequency resource identifiers associated with resources on which an aggressor UE may be scheduled to transmit, location or direction information about the aggressor UE, or a level or severity of interference or saturation expected to be caused by the aggressor UE.

In some examples of the method, apparatuses, and non-transitory computer-readable medium described herein, the one or more conditions with which the state identifier may be associated include combinations of one or more measurement resources, measurement objects, reporting objects, a receive beam on which the UE was communicating when determining that the saturation threshold had been exceeded, or a transfer beam on which the UE was communicating when determining that the saturation threshold had been exceeded.

Some examples of the method, apparatuses, and non-transitory computer-readable medium described herein may further include operations, features, means, or instructions for receiving, from the UE, an indication that a state identifier associated with the one or more conditions may be to be cleared, continued, or updated based on a mobility of the UE.

Some examples of the method, apparatuses, and non-transitory computer-readable medium described herein may further include operations, features, means, or instructions for transmitting, to one or more wireless devices, a message indicating the one or more conditions may be scheduled to repeat at the UE, where the one or more wireless devices include additional base stations, additional UEs, or both.

In some examples of the method, apparatuses, and non-transitory computer-readable medium described herein, receiving the indication may include operations, features, means, or instructions for receiving the indication in association with a quasi-colocation type reserved for use by UEs having LNAs operating in a non-linearity state.

DETAILED DESCRIPTION

In some wireless communications systems, a user equipment (UE) may operate in a full duplex (FD) mode, where the UE may transmit and receive concurrently. For example, a base station may send a downlink transmission to a UE, while the UE may concurrently transmit an uplink message to the base station (or to another device). However, transmitting and receiving concurrently may result in self-interference at the UE, where the UE's uplink transmission creates interference for the reception of the downlink transmission intended for the UE. In addition, a UE may process received signals using a low noise amplifier (LNA), which may have a number of gain settings to allow the UE to properly amplify a signal without saturating the signal. Nevertheless, when a UE receives self-interference on top of another signal, the LNA may saturate the received signal and operate within a nonlinear zone.

As described herein, a UE may recognize when an LNA becomes saturated and may then notify a base station of the saturation. For example, a UE may determine a saturation threshold is exceeded at one or more LNAs and may send an indication of the saturation to a base station. In some cases, the UE may also indicate the receive beam used at the time of saturation, and any transmit beam used for full duplex communications at the time of saturation. The UE may then receive additional signaling from the base station that accounts for or otherwise attempts to mitigate the LNA saturation. For example, the UE may apply a digital linearizer after an analog-to-digital converter (ADC) to linearize the signal from the LNA. By receiving pre-compensated signaling from the base station, the UE can apply the digital linearizer to "undo" some of the effects of the LNA. The base station can warn the UE that circumstances similar to those that occurred when the LNA had previously been saturated are scheduled to occur again. In this way, the UE may determine how to adjust the digital linearizer to the signaling received from the base station.

Aspects of the disclosure are initially described in the context of wireless communications systems. Aspects of the disclosure are further described in the context of receiver diagrams and a process flow. Aspects of the disclosure are further illustrated by and described with reference to apparatus diagrams, system diagrams, and flowcharts that relate to LNA saturation mitigation.

Figure 1:
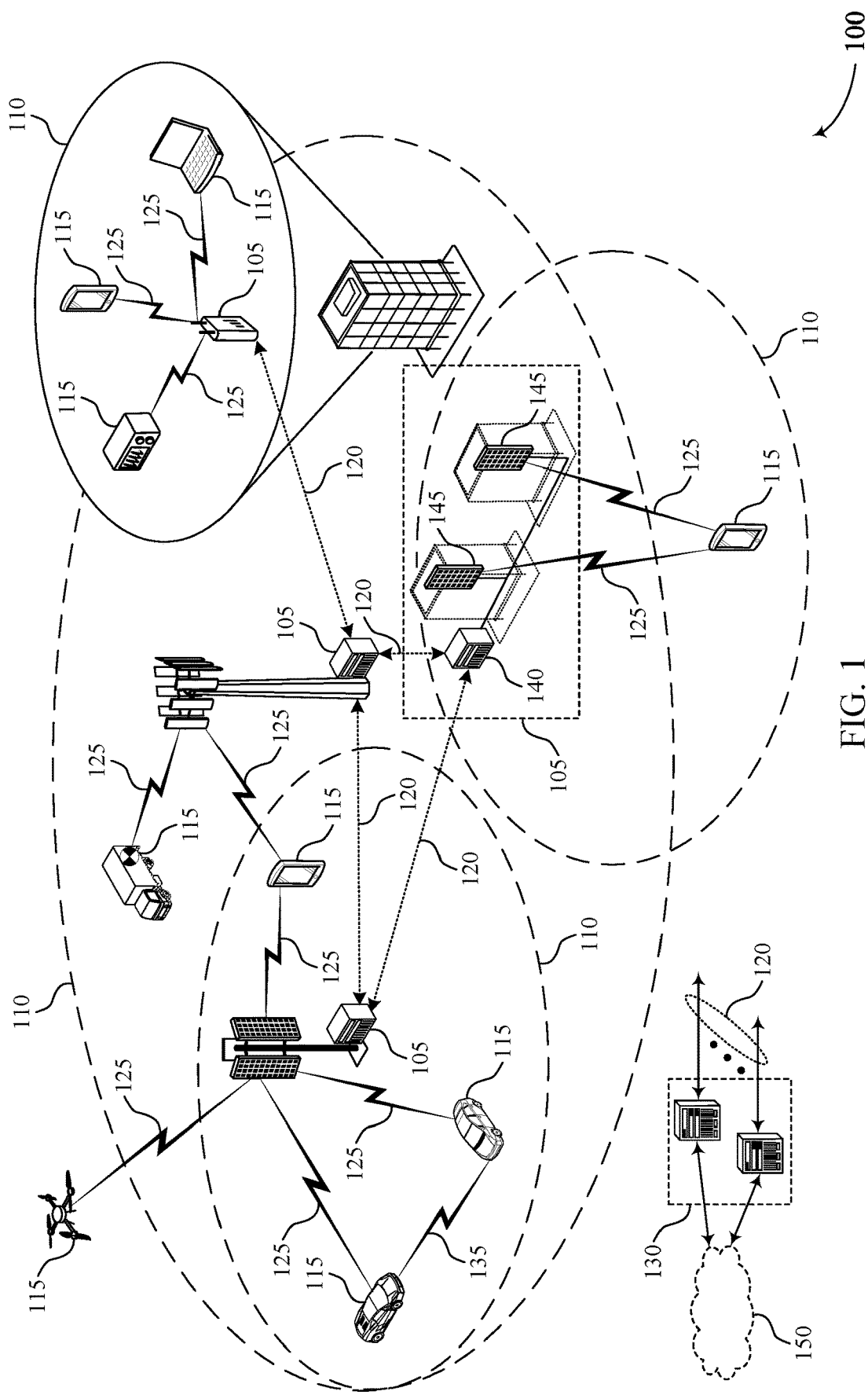
FIGS. 1 and 2 illustrate examples of wireless communications systems that support low noise amplifier (LNA) saturation mitigation in accordance with aspects of the present disclosure.

FIG. 1 illustrates an example of a wireless communications system 100 that supports LNA saturation mitigation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a wireless device may operate according to a full duplex mode in which the wireless device may transmit and receive concurrently. A wireless device may be any combination of a UE 115, a base station 105, a centralized unit, a distributed unit, a core network 130, a management entity, an operations, administrations and management entity, or like thereof. For example, a UE 115 or a base station may transmit and receive signaling concurrently. In some examples, one or more LNAs may be utilized in wireless communications to amplify a signal at a receiving wireless device for additional processing. A UE 115, a base station 105, or both may pass a received signal through an LNA to amplify the signal without degradation of the SNR, which is described in further detail with reference to FIG. 3. In some cases, the power level of a signal may exceed the range of the LNA, producing a non-linear response, which may result in LNA saturation. When LNA saturation occurs, a wireless device may be unable to process a signal (e.g., due to a non-linear response), which may cause latency related to retransmissions.

In some cases, a UE may apply a digital linearizer after an ADC to linearize the signal from the LNA, as described with reference to FIG. 4. Performance of the digital linearizer may depend on the LNA characteristics and the distribution of the signal. For example, a digital linearizer at the UE 115 may determine the input or output of a non-linear operator, such as an LNA, based on Equation 1:

$$y = G(x) = x + d_x$$

where d is the wideband non-linear distortion and x is the wideband received signal. In some cases (e.g., non-linear distortion introduced by an LNA), the power of the error is significantly lower than that of the signal, as described by Equation 2:

$$E(|d_x|^2) << E(|x|^2).$$

The UE may apply the digital linearizer to combat some of the effects of the LNA, such as non-linear distortions caused by LNA saturation exceeding a threshold.

While operating in full duplex mode, a wireless device, such as a UE 115 or a base station 105, may experience signal interference. For example, a UE 115 may transmit a signal that interferes, directly or via a reflector, with a signal that the UE 115 receives concurrently, which may be referred to as self-interference 220. UE 115-a may receive signaling 215-a from base station 105-a while UE 115-a concurrently transmits signaling 215-b to UE 115-b. Thus, UE 115-a may experience self-interference 220 between signaling 215-a and signaling 215-b. In some other examples, a UE 115 may transmit or receive beams that overlap spatially with beams of a second UE 115 (e.g., non-pencil spatial beam response), which may be referred to as cross interference 225. UE 115-a may receive signaling 215-a from base station 105-a while UE 115-b concurrently receives signaling 215-c from base station 105-a. Thus, UE 115-a may experience cross interference 225 due to overlap of signaling 215-a and signaling 215-c. In some cases, self-interference or cross interference may result in LNA saturation exceeding a threshold.

A UE 115 may recognize when an LNA is saturated and notify a base station 105 of the saturation. For example, a UE 115 may receive a signal from a base station 105 with a power level exceeding the range of the LNA (e.g., due to self-interference 220 or cross interference 225) and recognize that LNA saturation threshold is exceeded at one or more LNAs. Therefore, a UE 115 may send an indication to the base station 105 that the LNA saturation threshold has been exceeded. For example, UE 115-a may experience self-interference 220 or cross interference 225 during reception of signaling 215-a. UE 115-a may pass signaling 215-a through an LNA and, at 230, determine a saturation threshold has been exceeded. UE 115-a may then transmit a saturation threshold indication 235 to base station 105-a. In some cases, a saturation threshold indication 235 may carry information about a beam usage, received beam or array ID, transmitted beam or array ID (e.g., for self-interference 220), the amount or severity of the saturation, the new resources over which the saturation is detected, or a combination thereof. Further, a UE 115 may receive additional signaling from the base station 105 that accounts for, or otherwise attempts to mitigate, the LNA saturation. For example, base station 105-a may transmit signaling 215-d to UE 115-a based on the received saturation threshold indication 235.

In some cases, a base station 105 may record a system configuration for which it has received a saturation indication from a UE 115. The base station 105 may define this state as state X. The system configuration and the state X may refer to or be associated with other wireless devices that were transmitting at the same time and may have caused interference (e.g., for cross interference 225). For example, UE 115-a may experience cross interference 225 due to concurrent transmissions to UE 115-b, self-interference 220, or both. Therefore, UE 115-a may transmit saturation threshold indication 235 to base station 105-a. Upon receiving saturation threshold indication 235, base station 105-a may define a state X based on a system configuration associated with UE 115-b. State X may also refer to or be associated with transmission configurations of other transmitting wireless devices, such as transmit beam, transmit power, transmit bandwidth, transmit timing, transmit beams, receive beams, or a combination thereof associated with the saturation event. Transmission configuration information may be reported along with a saturation indication or may already be known by the network scheduler. Further, state X may contain information such as location information, mobility (e.g., speed/direction) information, resources (e.g., their type, as in uplink, downlink, flexible, or the like) over which saturation is detected.

In some cases, a base station 105 may determine state X may occur and send an indication to a UE 115 prior to transmission of a signal in conditions corresponding to state X. An indication may be sent as a flag in a downlink control information (DCI) message (e.g., a new DCI format, DCI sending the upcoming communication, or in a group-common DCI), semi-statically (e.g., via RRC signaling or a medium access control-control element (MAC-CE) providing information about a set of resources over which saturation may happen), or as a broadcast signal (e.g., a UE 115 may broadcast an indication to nearby sidelink UEs 115). For example, base station 105-a may send an indication of state X to a UE 115 via a downlink communication link 205. The indication may include a specified state (e.g., state ID may be included in the DCI), time and frequency resources over which a wireless device causing interference may be active, the level or severity of the interference or saturation, information about location, direction, or a combination thereof. In some cases, time and frequency resources may be implicitly communicated. For example, UE 115-*b* may cause cross interference 225 with UE 115-*a* while using a given set of time and frequency resources. Base station 105-*a* may communicate the time and frequency resources used by UE 115-*b* during cross interference 225 to UE 115-*a* by sending an indication of state X to UE 115-*a* using the same time and frequency resources as used by UE 115-*b* during interference.

In some other cases, state X may refer to or be associated with measurement resources, measurement objects, reporting objects, or a combination thereof of a UE 115 for which the UE 115 sends the saturation threshold indication 235. For example, a UE 115 may perform self-interference measurement autonomously (e.g., may detect self-interference based on signal quality measurements, or the like). A network may configure the UE 115 to determine beams on which LNA saturation may have occurred. Further, state X may refer to the transmit and receive beams associated with the saturation indication sent by a wireless device. The state X may be an index or ID, from a preconfigured range, which a UE 115 may include in the saturation threshold indication 235. A base station 105 and the UE 115 may use the index or ID for state X as a reference to determine whether the state X may occur again.

In some cases, a UE 115 experiencing LNA saturation may set an LNA and digital linearizer state accordingly. For example, a UE 115 may receive an indication (e.g., via a DCI message) regarding an incoming state X based on the conditions resulting in LNA saturation, and may decode the state and estimate a non-linear distortion. If the LNA saturation is due at least in part on UE mobility, a UE 115 may indicate to a network entity that the incoming state is clear. In some cases, the UE mobility may refer to a speed and direction in which the UE 115 is moving. If the LNA saturation is not due to UE mobility, the UE 115 may indicate for the network entity to continue (e.g., to avoid the LNA saturation at the UE 115). For example, UE 115-*a* may receive signaling 215-*a* from base station 105-*a* and experience cross interference 225, self-interference 220, or both resulting in LNA saturation due to a state X. At 230, UE 115-*a* may determine a saturation threshold is exceeded and transmit a saturation threshold indication 235 to base station 105-*a*. At a later time, base station 105-*a* may transmit signaling 215-*d* including an indication that state X may occur. UE 115-*a* may decode the state X and estimate the non-linear distortion. Therefore, UE 115-*a* may set an LNA and digital linearizer according to the estimated non-linear distortion. Further, a UE 115 may search other beams or cells to find candidates for which there may not be conditions resulting in LNA saturation.

In some cases, a wireless device may share associated information regarding state X or a saturation issue of the wireless device with one or more other wireless devices (e.g., transmitting an alarm over sidelink or sending a notification to a base station 105). For example, UE 115-*a* may transmit a notification of LNA saturation or information regarding state X to UE 115-*b* using signaling 215-*b*. In some cases, a wireless device may send a notification to a user, which may be displayed on a user interface (e.g., displaying a warning message, vibration, sound, or the like).

In some cases (e.g., for self-interference 220), a UE 115 may define an LNA state and coefficients for a digital linearizer for each pair of transmit and receive beams. Upon activation of the transmit and receive beams, a UE 115 may set a configuration based on a pre-defined LNA state and coefficients for digital linearizer. For example, UE 115-*a* may define a configuration that correspond to concurrent transmissions of signaling 215-*a* and signaling 215-*b*. Upon concurrent transmission of signaling 215-*a* and signaling 215-*b*, UE 115-*a* may set an LNA and digital linearizer to the defined configuration (e.g., predefined configuration). Further, a UE 115 may monitor and measure LNA saturation levels of an incoming transmission and decide an LNA state and digital linearizer coefficients for a subsequent transmission. For example, the UE 115, a base station 105, or both may define a quasi-co-location (QCL) type for LNA non-linear characteristics. A wireless device may predict and estimate the link budget of an interference (e.g., for self-interference 220) and set the LNA state accordingly. In some other cases (e.g., for cross interference 225), a receiving wireless device may not be aware of a link budget and may identify another wireless device transmitting a signal and generating cross interference 225. In some cases, a wireless device may cancel communication, change a configuration, or reselect a beam or cell if excessive interference occurs. For example, if the interference surpasses a threshold at UE 115-*a*, UE 115-*a* may cancel signaling 215-*d* with base station 105-*a* to reduce LNA saturation.

In some examples, a wireless device may adjust signal transmission scheduling to avoid interference. In some cases, such as for cross interference 225, a network entity may manage a cross interference plan to avoid interference of a wireless device. For example, base station 105-*a* may reschedule signaling 215-*d* to UE 115-*a* based on UE 115-*a* being in a saturation mode. In some other cases, such as for self-interference 220, a network entity may fallback to half-duplex to solve the saturation issue. For example, if UE 115-*a* is operating in a full duplex mode and determines a saturation threshold is exceeded at 230, UE 115-*a* may fall back to a half-duplex mode to receive signaling 215-*d*, rather than transmitting signaling 215-*b* and receiving signaling 215-*d* concurrently. Further, through control signaling including a beam or transmit power configuration, a wireless device may reconfigure the transmission or reception beams or transmission power configuration of a wireless device to avoid interference or saturation.

Figure 2:
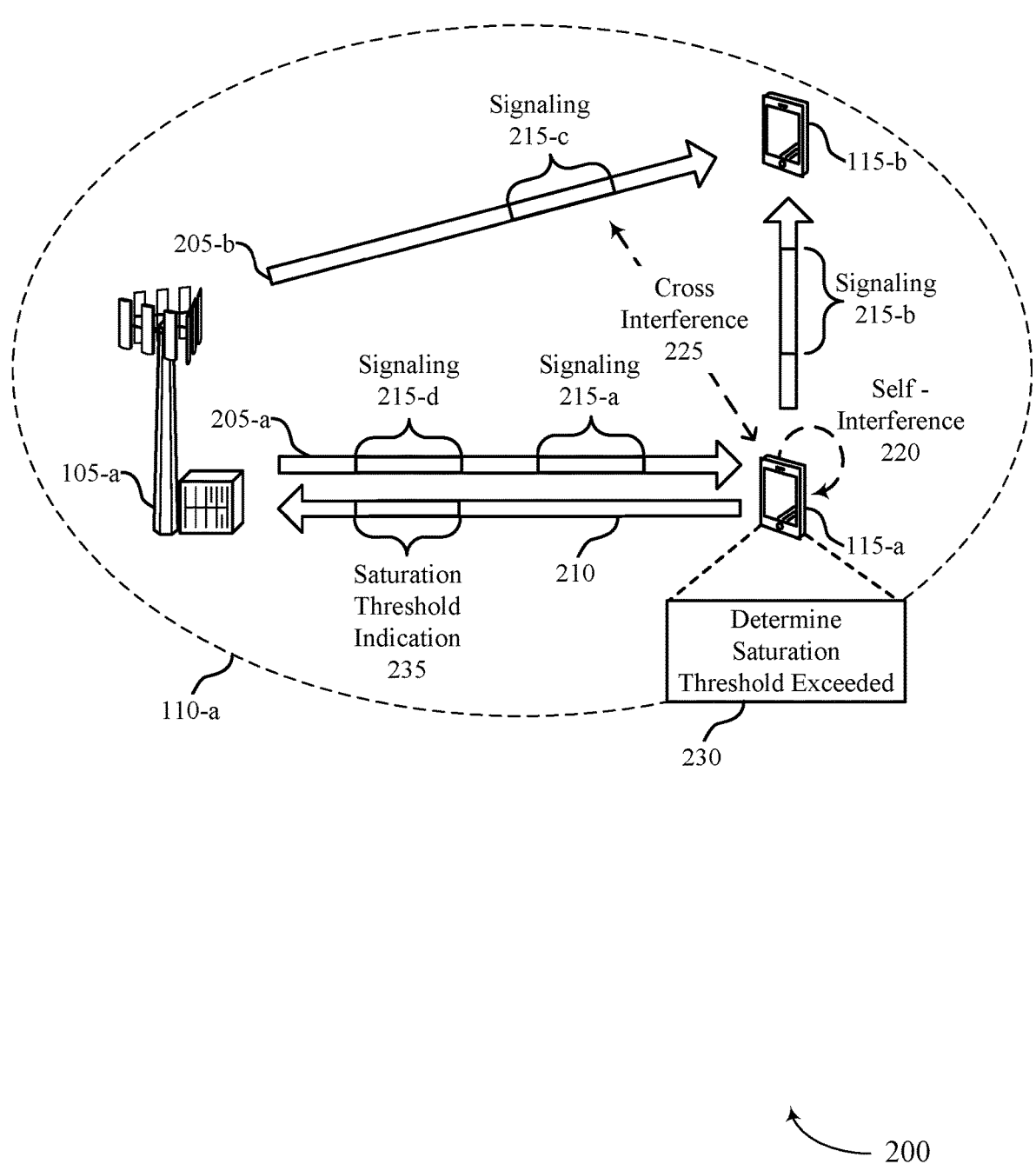

FIG. 2 illustrates an example of a wireless communications system 200 that supports LNA saturation mitigation in accordance with aspects of the present disclosure. In some examples, wireless communications system 200 may implement aspects of wireless communications system 100 and may include a UE 115-*a*, a UE 115-*b*, and a base station 105-*a* with a coverage area 110-*a*, which may be examples of UEs 115 and a base station 105 with a coverage area 110 as described with reference to FIG. 1. In some examples, base station 105-*a* and one or more UEs 115, such as UE 115-*a* and UE 115-*b*, may communicate control information, data, or both using a downlink communication link 205 and an uplink communication link 210. For example, UE 115-*a* may transmit an indication of LNA saturation to base station 105-*a* based on exceedance of an LNA saturation threshold.

In some cases, a wireless device may operate according to a full duplex mode in which the wireless device may transmit and receive concurrently. For example, UE 115-*a* may receive signaling 215-*a* from base station 105-*a* while also transmitting signaling 215-*b* to UE 115-*b*. Thus, UE 115-*a* may transmit and receive signaling 215 concurrently. Operating according to a full duplex mode may reduce the potential uplink and downlink contention and therefore the latency, especially in asymmetric links. Further, a UE may operate according to a full duplex mode using route selection algorithms. A UE may use route selection algorithms to preconfigure signals to change, or hop, their carrier frequencies during transmission to avoid interference. Therefore, a UE may operate in both downlink and uplink directions, reducing routing delays and latency. Additionally or alternatively, operating according to a full duplex may increase throughput due to a lower signal-to-noise ratio (SNR). For example, without full duplex, SNR may be greater than 10 dB and $SNR^m$ may increase throughput by a factor m.

In some examples, one or more LNAs may be utilized in wireless communications to amplify a signal at a receiving wireless device for additional processing. A UE 115, a base station 105, or both may pass a received signal through an LNA to amplify the signal without degradation of the SNR, which is described in further detail with reference to FIG. 3. For example, upon reception of signaling 215-a from base station 105-a, UE 115-a may pass signaling 215-a through an LNA and amplify the signal according to a gain state. UE 115 may determine if the power level of a signal, such as signaling 215-a, falls within the range of the LNA, which may be a dynamic range. The range of an LNA may be bounds by which a signal produces a linear response. In linear response cases, a UE 115 may predict signal response based on linear trends and reduce noise to allow for further signal processing. In some cases, the power level of a signal may exceed the range of the LNA, producing a non-linear response. Further, varying input power levels may result in different non-linear characteristics depending on the ratio of input to output power defined by the LNA (e.g., gain state). When a non-linear response occurs a UE 115 may be unable to predict signal response and reduce noise for further processing, thus resulting in LNA saturation. When LNA saturation occurs, a wireless device may be unable to process a signal (e.g., due to a non-linear response), which may cause latency related to retransmissions.

In some cases, a UE may apply a digital linearizer after an ADC to linearize the signal from the LNA, as described with reference to FIG. 4. Performance of the digital linearizer may depend on the LNA characteristics and the distribution of the signal. For example, a digital linearizer at the UE 115 may determine the input or output of a non-linear operator, such as an LNA, based on Equation 1:

$$y = G(x) = x + d_x$$

where d is the wideband non-linear distortion and x is the wideband received signal. In some cases (e.g., non-linear distortion introduced by an LNA), the power of the error is significantly lower than that of the signal, as described by Equation 2:

$$E(|d_x|^2) << E(|x|^2).$$

The UE may apply the digital linearizer to combat some of the effects of the LNA, such as non-linear distortions caused by LNA saturation exceeding a threshold.

While operating in full duplex mode, a wireless device, such as a UE 115 or a base station 105, may experience signal interference. For example, a UE 115 may transmit a signal that interferes, directly or via a reflector, with a signal that the UE 115 receives concurrently, which may be referred to as self-interference 220. UE 115-a may receive signaling 215-a from base station 105-a while UE 115-a concurrently transmits signaling 215-b to UE 115-b. Thus, UE 115-a may experience self-interference 220 between signaling 215-a and signaling 215-b. In some other examples, a UE 115 may transmit or receive beams that overlap spatially with beams of a second UE 115 (e.g., non-pencil spatial beam response), which may be referred to as cross interference 225. UE 115-a may receive signaling 215-a from base station 105-a while UE 115-b concurrently receives signaling 215-c from base station 105-a. Thus, UE 115-a may experience cross interference 225 due to overlap of signaling 215-a and signaling 215-c. In some cases, self-interference or cross interference may result in LNA saturation exceeding a threshold.

A UE 115 may recognize when an LNA is saturated and notify a base station 105 of the saturation. For example, a UE 115 may receive a signal from a base station 105 with a power level exceeding the range of the LNA (e.g., due to self-interference 220 or cross interference 225) and recognize that LNA saturation threshold is exceeded at one or more LNAs. Therefore, a UE 115 may send an indication to the base station 105 that the LNA saturation threshold has been exceeded. For example, UE 115-a may experience self-interference 220 or cross interference 225 during reception of signaling 215-a. UE 115-a may pass signaling 215-a through an LNA and, at 230, determine a saturation threshold has been exceeded. UE 115-a may then transmit a saturation threshold indication 235 to base station 105-a. In some cases, a saturation threshold indication 235 may carry information about a beam usage, received beam or array ID, transmitted beam or array ID (e.g., for self-interference 220), the amount or severity of the saturation, the new resources over which the saturation is detected, or a combination thereof. Further, a UE 115 may receive additional signaling from the base station 105 that accounts for, or otherwise attempts to mitigate, the LNA saturation. For example, base station 105-a may transmit signaling 215-d to UE 115-a based on the received saturation threshold indication 235.

In some cases, a base station 105 may record a system configuration for which it has received a saturation indication from a UE 115. The base station 105 may define this state as state X. The system configuration and the state X may refer to or be associated with other wireless devices that were transmitting at the same time and may have caused interference (e.g., for cross interference 225). For example, UE 115-a may experience cross interference 225 due to concurrent transmissions to UE 115-b, self-interference 220, or both. Therefore, UE 115-a may transmit saturation threshold indication 235 to base station 105-a. Upon receiving saturation threshold indication 235, base station 105-a may define a state X based on a system configuration associated with UE 115-b. State X may also refer to or be associated with transmission configurations of other transmitting wireless devices, such as transmit beam, transmit power, transmit bandwidth, transmit timing, transmit beams, receive beams, or a combination thereof associated with the saturation event. Transmission configuration information may be reported along with a saturation indication or may already be known by the network scheduler. Further, state X may contain information such as location information, mobility (e.g., speed/direction) information, resources (e.g., their type, as in uplink, downlink, flexible, or the like) over which saturation is detected.

In some cases, a base station 105 may determine state X may occur and send an indication to a UE 115 prior to transmission of a signal in conditions corresponding to state X. An indication may be sent as a flag in a DCI (e.g., a new DCI format, DCI sending the upcoming communication, or in a group-common DCI), semi-statically (e.g., via RRC signaling or a MAC-CE providing information about a set of resources over which saturation may happen), or as a broadcast signal (e.g., a UE 115 may broadcast an indication to nearby sidelink UEs 115). For example, base station 105-a may send an indication of state X to a UE 115 via a downlink communication link 205. The indication may include a specified state (e.g., state ID may be included in the DCI), time and frequency resources over which a wireless device causing interference may be active, the level or severity of the interference or saturation, information about location, direction, or a combination thereof. In some cases, time and frequency resources may be implicitly communicated. For example, UE 115-b may cause cross interference 225 with UE 115-a while using a given set of time and frequency resources. Base station 105-a may communicate the time and frequency resources used by UE 115-b during cross interference 225 to UE 115-a by sending an indication of state X to UE 115-a using the same time and frequency resources as used by UE 115-b during interference.

In some other cases, state X may refer to or be associated with measurement resources, measurement objects, reporting objects, or a combination thereof of a UE 115 for which the UE 115 sends the saturation threshold indication 235. For example, a UE 115 may perform self-interference measurement autonomously (e.g., may detect self-interference based on signal quality measurements, or the like). A network may configure the UE 115 to determine beams on which LNA saturation may have occurred. Further, state X may refer to the transmit and receive beams associated with the saturation indication sent by a wireless device. The state X may be an index or ID, from a preconfigured range, which a UE 115 may include in the saturation threshold indication 235. A base station 105 and the UE 115 may use the index or ID for state X as a reference to determine whether the state X may occur again.

In some cases, a UE 115 experiencing LNA saturation may set an LNA and digital linearizer state accordingly. For example, a UE 115 may receive an indication (e.g., via a DCI message) regarding an incoming state X based on the conditions resulting in LNA saturation, and may decode the state and estimate a non-linear distortion. If the LNA saturation is due at least in part on UE mobility, a UE 115 may indicate to a network entity that the incoming state is clear. In some cases, the UE mobility may refer to a speed and direction in which the UE 115 is moving. If the LNA saturation is not due to UE mobility, the UE 115 may indicate for the network entity to continue (e.g., to avoid the LNA saturation at the UE 115). For example, UE 115-a may receive signaling 215-a from base station 105-a and experience cross interference 225, self-interference 220, or both resulting in LNA saturation due to a state X. At 230, UE 115-a may determine a saturation threshold is exceeded and transmit a saturation threshold indication 235 to base station 105-a. At a later time, base station 105-a may transmit signaling 215-d including an indication that state X may occur. UE 115-a may decode the state X and estimate the non-linear distortion. Therefore, UE 115-a may set an LNA and digital linearizer according to the estimated non-linear distortion. Further, a UE 115 may search other beams or cells to find candidates for which there may not be conditions resulting in LNA saturation.

In some cases, a wireless device may share associated information regarding state X or a saturation issue of the wireless device with one or more other wireless devices (e.g., transmitting an alarm over sidelink or sending a notification to a base station 105). For example, UE 115-a may transmit a notification of LNA saturation or information regarding state X to UE 115-b using signaling 215-b. In some cases, a wireless device may send a notification to a user, which may be displayed on a user interface (e.g., displaying a warning message, vibration, sound, or the like).

In some cases (e.g., for self-interference 220), a UE 115 may define an LNA state and coefficients for a digital linearizer for each pair of transmit and receive beams. Upon activation of the transmit and receive beams, a UE 115 may set a configuration based on a pre-defined LNA state and coefficients for digital linearizer. For example, UE 115-a may define a configuration that correspond to concurrent transmissions of signaling 215-a and signaling 215-b. Upon concurrent transmission of signaling 215-a and signaling 215-b, UE 115-a may set an LNA and digital linearizer to the defined configuration (e.g., predefined configuration). Further, a UE 115 may monitor and measure LNA saturation levels of an incoming transmission and decide an LNA state and digital linearizer coefficients for a subsequent transmission. For example, the UE 115, a base station 105, or both may define a quasi-co-location (QCL) type for LNA non-linear characteristics. A wireless device may predict and estimate the link budget of an interference (e.g., for self-interference 220) and set the LNA state accordingly. In some other cases (e.g., for cross interference 225), a receiving wireless device may not be aware of a link budget and may identify another wireless device transmitting a signal and generating cross interference 225. In some cases, a wireless device may cancel communication, change a configuration, or reselect a beam or cell if excessive interference occurs. For example, if the interference surpasses a threshold at UE 115-a, UE 115-a may cancel signaling 215-d with base station 105-a to reduce LNA saturation.

In some examples, a wireless device may adjust signal transmission scheduling to avoid interference. In some cases, such as for cross interference 225, a network entity may manage a cross interference plan to avoid interference of a wireless device. For example, base station 105-a may reschedule signaling 215-d to UE 115-a based on UE 115-a being in a saturation mode. In some other cases, such as for self-interference 220, a network entity may fallback to half-duplex to solve the saturation issue. For example, if UE 115-a is operating in a full duplex mode and determines a saturation threshold is exceeded at 230, UE 115-a may fall back to a half-duplex mode to receive signaling 215-d, rather than transmitting signaling 215-b and receiving signaling 215-d concurrently. Further, through control signaling including a beam or transmit power configuration, a wireless device may reconfigure the transmission or reception beams or transmission power configuration of a wireless device to avoid interference or saturation.

Figure 3:
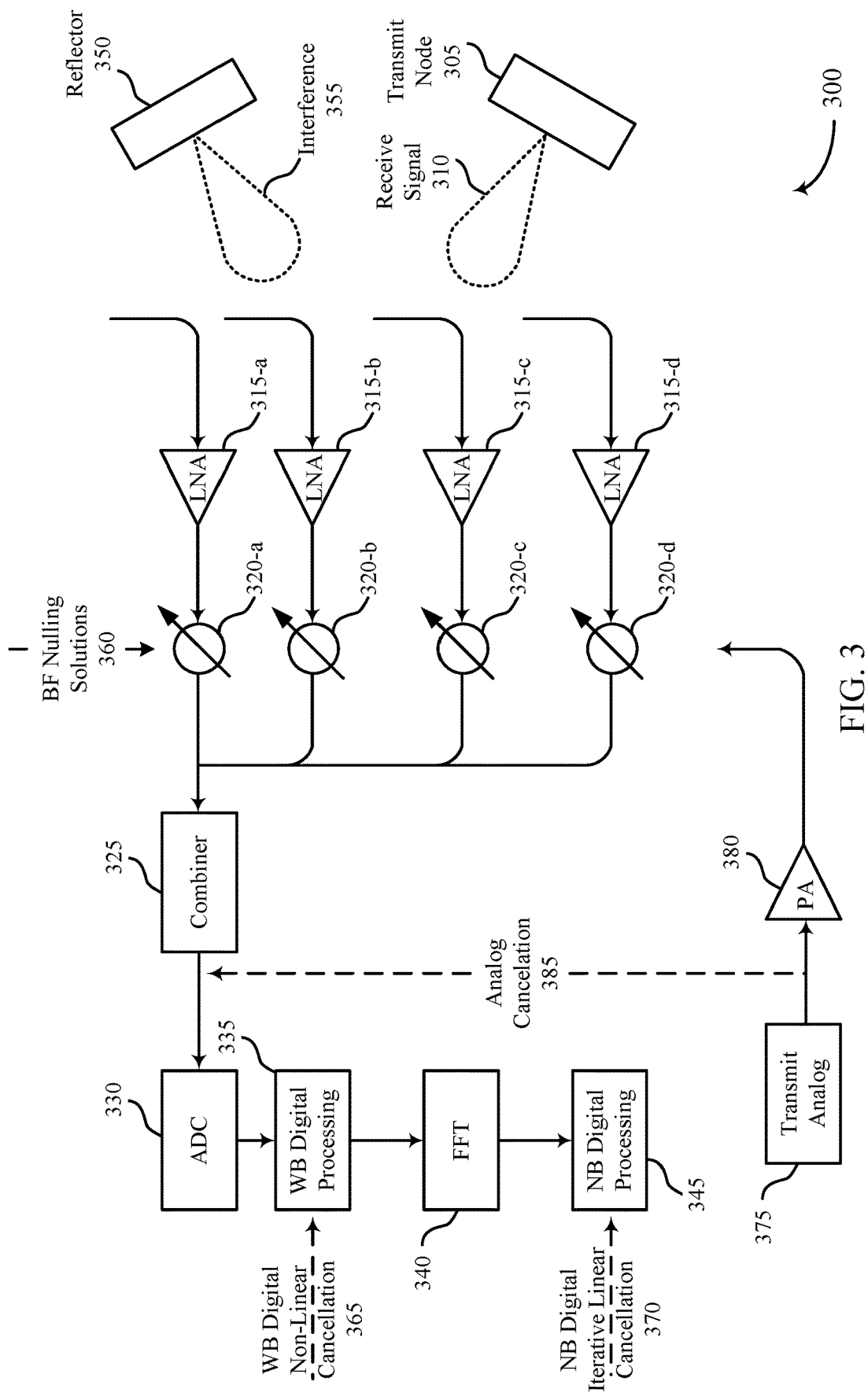
FIGS. 3 and 4 illustrate example of receiver diagrams that support LNA saturation mitigation in accordance with aspects of the present disclosure.

FIG. 3 illustrates an example of a receiver diagram 300 that supports LNA saturation mitigation in accordance with aspects of the present disclosure. In some examples, receiver diagram 300 may implement aspects of wireless communication system 100 and wireless communications system 200. For example, receiver diagram 300 may be implemented by a UE 115 and a base station 105 as described with reference to FIGS. 1 and 2. In some examples, a UE 115 may apply a digital linearizer after an ADC during wideband digital processing to counteract non-linear distortions caused by LNA saturation.

In some cases, a transmit node 305, such as a node at a base station 105, may transmit receive signal 310, which may be an example of signaling 215 as described with reference to FIG. 2, to a UE 115 and may process the receive signal 310 according to receiver diagram 300. A UE 115 may receive the receive signal 310 and pass it through an LNA 315 for amplification. Upon amplification, a mixer 320 may mix the frequency of the receive signal 310 with a defined local oscillator frequency to shift the frequency range of the receive signal 310 to a new frequency range for further processing. In some cases, multiple LNA 315 and mixer 320 pairs may process receive signal 310 before a combiner 325 may combine the output of the multiple LNA 315 and mixer 320 pairs into a single signal. ADC 330 may then convert receive signal 310 from analog to digital. Upon conversion from analog to digital, receive signal 310 may be passed through wideband (WB) digital processing 335, which is described in further detail with reference to FIG. 4, before being passed through a fast Fourier transform (FFT) 345 to convert the receive signal 310 into individual spectral components for further processing. A receiver may then pass the receive signal 310 through narrowband (NB) digital processing 345 for additional processing.

For example, a UE 115 may receive the receive signal 310 from transmit node 305 and pass it through LNAs 315. LNA 315-a may amplify the receive signal 310 before transmitting the receive signal 310 to mixer 320-a. Further, LNA 315-b may amplify the receive signal 310 before transmitting the signal 310 to mixer 320-b, LNA 315-c may amplify the receive signal 310 before transmitting the signal 310 to mixer 320-c, and LNA 315-d may amplify the receive signal 310 before transmitting the receive signal 310 to mixer 320-d. Combiner 325 may receive the outputs from mixer 320-a, mixer 320-b, mixer 320-c, and mixer 320-d before combing them into one signal. An ADC 330 may then receive the combined signal from the combiner 325 and may convert the combined signal from analog to digital. The receive signal 310 may then be passed through WB digital processing 335, FFT 340, and NB digital processing 345 for additional processing in the receive chain.

In some cases, signal interference 355 may not result in LNA saturation. For example, a UE 115 may receive the receive signal 310 from transmit node 305 while a reflector 350 causes interference 355 (e.g., self-interference or cross interference). In some cases, when signal interference that may not result in LNA saturation occurs, a receiver may apply beamformer (BF) nulling solutions 360 at a mixer 320 to create constructive or destructive interference to cancel out the interference 355. In some other cases, where LNA saturation may not be present, WB digital non-linear cancellation 365 may be applied at WB digital processing 335 or NB digital iterative linear cancellation 370 may be applied at NB digital processing to cancel out interference 355. Further, to avoid interference resulting in LNA saturation, a UE 115 may operate in sub-band full duplex. A UE 115 operating in sub-band full duplex may dedicate a portion of antenna and frequency resources to uplink transmissions while the rest are dedicated to support downlink transmissions. For example, a UE 115 may receive the receive signal 310 from transmit node 305 over a set of dedicated resources while also transmitting signaling from transmit analog 375 resulting in self-interference. While passing signaling from transmit analog 375 to a power amplifier (PA) 380 for transmission, a UE 115 may regenerate self-interference, which may affect the receive signal 310 after the combiner 325 to create analog cancelation 385. However, when LNA saturation occurs, BF nulling solutions 360, WB digital non-linear cancellation 365, NB digital iterative linear cancellation 370, and analog cancelation 385 may be ineffective at removing interference.

In some cases, LNA saturation (e.g., due to self-interference or cross interference) may result in non-linear distortions which may prevent elements further on in the receive chain from being able to properly predict signal behavior and clean the signal. For example, a UE 115 may receive the receive signal 310 from transmit node 305 while reflector 350 causes interference 355, such as self-interference or cross interference. Further, one or more LNAs 315 may receive the receive signal 310 with a power level exceeding an effective range, resulting in LNA saturation and non-linear distortions. Therefore, after passing through one or more mixers 320, combiners 325, and ADCs 330, the receiver may be unable to process the receive signal 310 using WB digital processing 335 due to non-linear distortions caused by saturation of one or more LNAs 315.

In some cases, an LNA linearizer may counter the effects of the non-linear distortions caused by LNA saturation, which may allow the signal response to become predictable. For example, upon LNA saturation at one or more LNAs 315, a UE 115 may send a saturation threshold indication to a base station 105. Upon receipt of saturation threshold indication, a base station 105 may transmit additional signaling. A UE 115 may receive and process the additional signaling at one or more LNAs 315, which may result in non-linear distortions. After passing through one or more mixers 320, combiner 325, and the ADC 330, signaling may pass through a digital linearizer, which may allow for further processing in a receive chain, as described with respects to FIG. 4.

Figure 4:
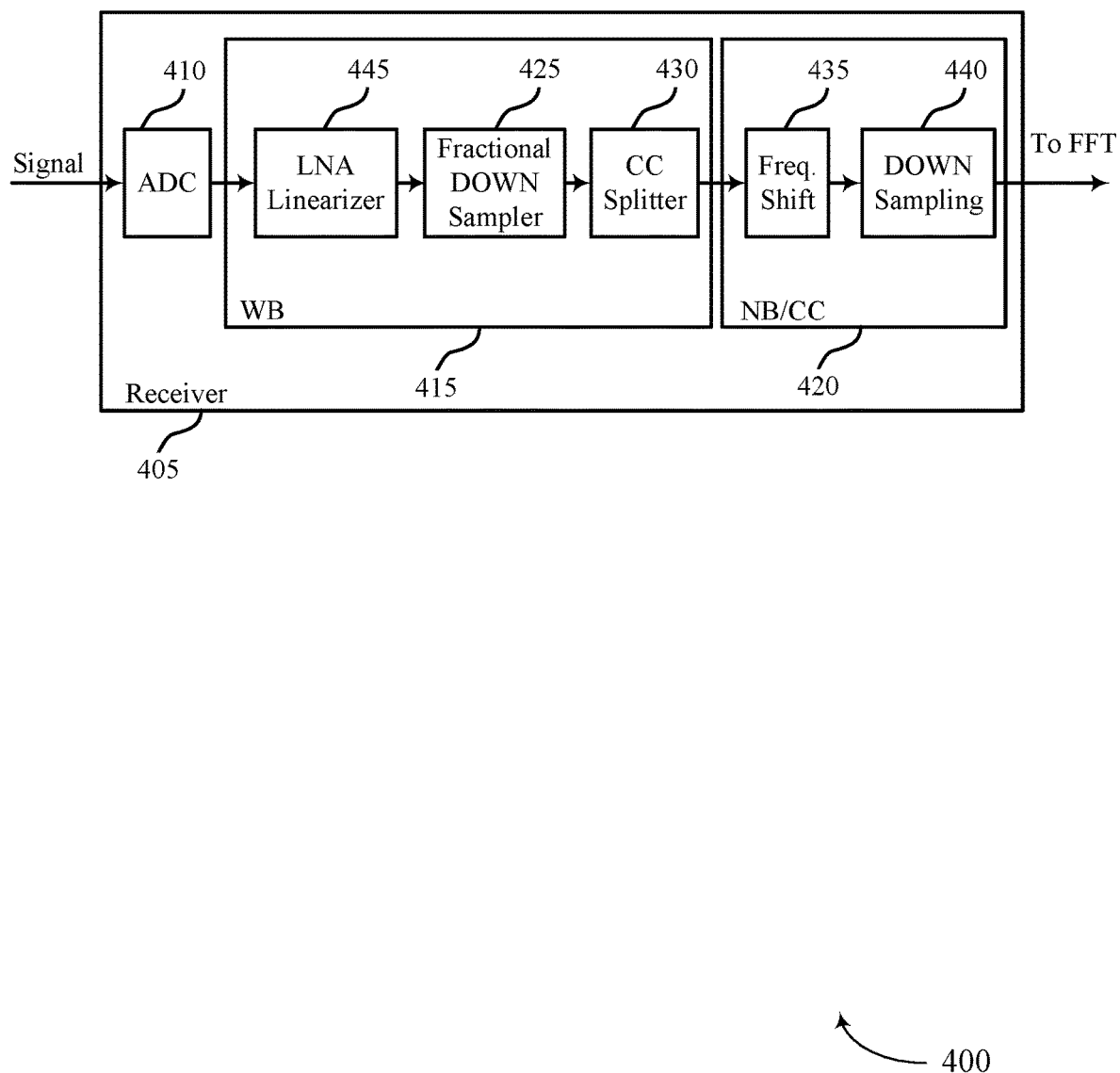

FIG. 4 illustrates an example of a receiver diagram 400 that supports LNA saturation mitigation in accordance with aspects of the present disclosure. In some examples, receiver diagram 400 may implement aspects of wireless communication system 100, wireless communications system 200, and receiver diagram 300. For example, receiver diagram 400 may be implemented by a UE 115 and a base station 105 as described with reference to FIGS. 1 and 2. In some cases, a UE may apply a digital linearizer at a receiver 405 after an ADC 410 to linearize the signal from an LNA.

In some cases, a UE 115 may receive signaling from a base station 105 and may pass the signaling through one or more LNAs, as described with reference to FIGS. 2 and 3. Upon passing the signaling through the one or more LNAs 315, a UE 115 may pass the signaling through a digital front end of a receiver 405 as part of a receive chain. The digital front end of a receiver 405 may include an ADC 410, WB digital processing 415, and NB digital processing 420. In some examples, the WB digital processing 415 may include sending signaling through a fractional DOWN sampler 425 and a component carrier (CC) splitter 430, while NB digital processing 420 may include a frequency shifter 435 and a DOWN sampling component 440.

In some examples, a UE 115 may receive signaling and pass the signaling through an ADC 410. The ADC 410 may convert the signaling from an analog signal to a digital signal. The receiver may then perform WB digital processing 415 on the signal, where a fractional DOWN sampler 425 may perform bandwidth reduction and sample-rate reduction on the signaling and a CC splitter 430 may split the signaling into multiple output signals with phase and amplitude characteristics. The receiver may send the signaling from the CC splitter 430 in the WB digital processing 415 to NB digital processing 420. At the NB digital processing 420, a frequency shifter 435 may shift the frequency of the processed signaling and a DOWN sampling component 440 may perform additional bandwidth and sample-rate reduction before passing the signaling to an FFT.

In some cases, a UE 115 may receive signaling, which may have a power level exceeding that of the range of an LNA (e.g., due to self-interference or cross interference). Therefore, an LNA at the UE 115 may experience LNA saturation, resulting in non-linear distortions. Upon the LNA saturation exceeding a threshold, a UE 115 may transmit a saturation threshold indication to a base station 105. The base station 105 may transmit additional signaling to the UE 115. The UE 115 may receive the additional signaling from the base station 105 and may process the signal according to receiver diagram 400. For example, a UE 115 may apply an LNA linearizer 445 (e.g., a digital linearizer) after an ADC 410 in the receive chain to linearize the signal from the LNA.

After passing the signaling through the ADC 410, a UE 115 may apply the LNA linearizer 445 to counteract non-linearities produced by an LNA experiencing saturation and may reduce the distortion of the signaling. For example, the UE 115 may receive signaling from a base station 105 based on sending a saturation indication, and may pass the signaling through an LNA. In some cases, the UE 115 may pass the signaling through the digital front end of a receiver 405, and the ADC 410 may convert the signaling from analog to digital. The LNA linearizer 445 may then linearize the signaling. The UE 115 may continue to process the signaling by passing the signaling through a fractional DOWN sampler 425, a CC splitter 430, a frequency shift 430, and DOWN sampling component 440 prior to passing signaling to an FFT.

Figure 5:
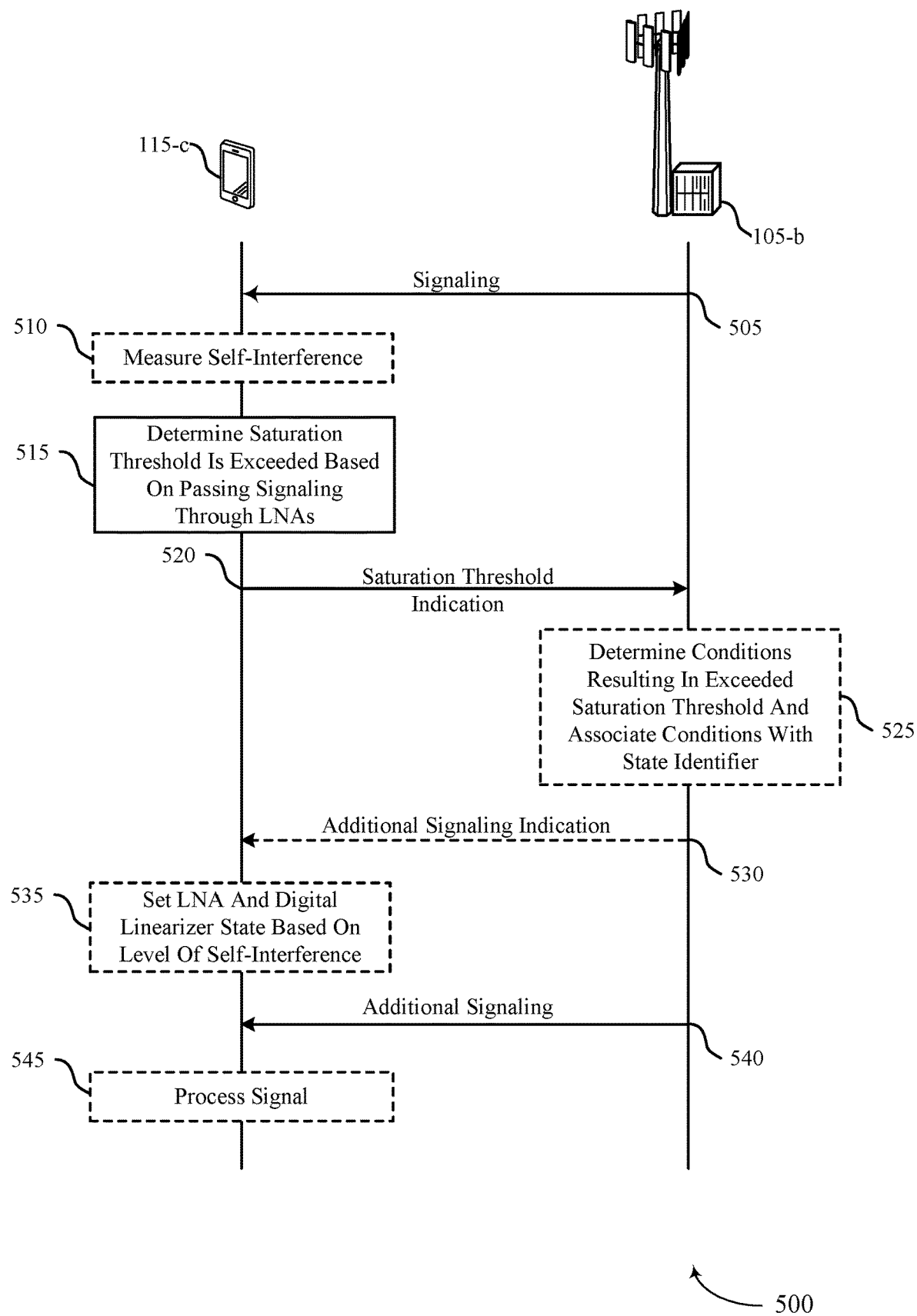
FIG. 5 illustrates an example of a process flow that supports LNA saturation mitigation in accordance with aspects of the present disclosure.

FIG. 5 illustrates an example of a process flow 500 that supports LNA saturation mitigation in accordance with aspects of the present disclosure. In some examples, process flow 500 may implement aspects of wireless communications system 100, wireless communications system 200, receiver diagram 300, and receiver diagram 400. The process flow 500 may illustrate an example of a UE 115-*c* receiving signaling from a base station 105-*c*, which may be examples of a UE 115 and a base station 105 as described with reference to FIGS. 1 and 2. UE 115-*c* may determine a saturation threshold for one or more LNAs is exceeded, and may transmit an indication that the threshold is exceeded to base station 105-*b*. Alternative examples of the following may be implemented, where some processes are performed in a different order than described or are not performed. In some cases, processes may include additional features not mentioned below, or further processes may be added.

At 505, UE 115-*c* may receive signaling from base station 105-*b*. In some cases, the signaling may include data or control signaling. The signaling may pass through one or more LNAs at UE 115-*c*.

At 510, UE 115-*c* may measure a level of self-interference arising from full duplex communications while UE 115-*c* receives the signaling at 505. The self-interference may result from UE 115-*c* transmitting and receiving signaling concurrently.

At 515, UE 115-*c* may determine that a saturation threshold is exceeded during processing of the signaling by the one or more LNAs at UE 115-*c*. In some examples, the saturation threshold may be defined at UE 115-*c* (e.g., preconfigured or configured by based station 105-*c*).

At 520, UE 115-*c* may transmit an indication that the saturation threshold is exceeded to base station 105-*b*. For example, UE 115-*c* may transmit information that is indicative of one or more pairs of receive beams and transmit beams on which UE 115-*c* may have been communicating when determining that the saturation threshold is exceeded. In some other examples, UE 115-*c* may transmit information that is indicative of a receive beam used to receive the signaling at 505, a receive array used to receive the signaling at 505, a transmit beam used during full duplex communications while UE 115-*c* was receiving the signaling at 505, a transmit array identifier used during full duplex communications while UE 115-*c* was receiving the signaling at 505, a saturation level of the one or more LNAs, one or more resources during which the saturation threshold was exceeded, or a combination thereof. In some cases, UE 115-*c* may transmit the indication in association with a QCL type reserved for use by UEs 115 having LNAs operating in a non-linearity state.

At 525, base station 105-*b* may determine one or more conditions that contributed to the saturation threshold being exceeded based on the indication from UE 115-*c*. Base station 105-*b* may associate the one or more conditions with a state identifier. In some cases, the state identifier may be based on a cross interference level at UE 115-*c*, a transmit beam used during full duplex communications by UE 115-*c*, a transmit power used during full duplex communications by UE 115-*c*, a transmit bandwidth used during full duplex communications by UE 115-*c*, a transmit timing used during full duplex communications by UE 115-*c*, a receive beam used by UE 115-*c* to receive the signaling, a self-interference level caused by full duplex communications at UE 115-*c*, location information corresponding to UE 115-*c*, mobility information corresponding to UE 115-*c*, resources corresponding to the exceeded saturation threshold, or a combination thereof.

In some cases, base station 105-*c* may transmit a message indicating the state identifier to a network entity. Base station 105-*c* may coordinate with the network entity to avoid at least a portion of the one or more conditions.

At 530, base station 105-*c* may transmit a message to UE 115-*c* indicating additional signaling.

At 535, UE 115-*c* may set an LNA state for the one or more LNAs at UE 115-*c* based on receiving the message. UE 115-*c* may set a digital linearizer state of a receive chain of UE 115-*c*. Additionally or alternatively, UE 115-*c* may set an LNA state for the one or more LNAs at UE 115-*c* based on a level of self-interference (e.g., measured at 510). UE 115-*c* may set a digital linearizer state for a digital linearizer at a digital front end of a receive chain of UE 115-*c* based on the level of self-interference.

At 540, UE 115-*c* may receive additional signaling from base station 105-*b* whose content, schedule, or configuration is responsive to the indication that the saturation threshold is exceeded. For example, UE 115-*c* may receive a message indicating that one or more conditions that previously resulted in the saturation threshold being exceeded during processing of the signaling by the one or more LNAs at UE 115-*c* may be scheduled to repeat. In some examples, UE 115-*c* may receive the message via a flag in a DCI message, an RRC message, a MAC-CE, or a sidelink broadcast message. The message may include at least one of a state identifier associated with the one or more conditions, time or frequency resource identifiers associated with resources on which an aggressor UE 115 may be scheduled to transmit, location or direction information about the aggressor UE 115, or a level or severity of interference or saturation expected to be caused by the aggressor UE 115. The aggressor UE 115 may be a UE 115 transmitting using a same time or frequency resource as UE 115-*c*, such that UE 115-*c* may experience cross-interference. In some cases, the one or more conditions with which the state identifier is associated include combinations of one or more measurement resources, measurement objects, reporting objects, a receive beam on which UE 115-*c* was communicating when determining that the saturation threshold had been exceeded, or a transfer beam on which UE 115-*c* was communicating when determining that the saturation threshold had been exceeded.

In some cases, UE 115-*c* may search for one or more beams or cells that are not associated with the one or more conditions that are scheduled to repeat in response to receiving the message. UE 115-*c* may transmit a notification to one or more wireless devices that is indicative that the saturation threshold may be expected to be exceeded during processing of the additional signaling. UE 115-*c* may alert a user of UE 115-*c*, in response to receiving the message, that wireless communications of UE 115-*c* are adversely affected due to the one or more conditions. In some cases, base station 105-*b* may modify at least one of the content, schedule, or configuration of the additional signaling based on the state identifier so as to avoid at least a portion of the one or more conditions.

At 545, UE 115-*c* may process the additional signaling using a digital linearizer of a receive chain of UE 115-*c*. UE 115-*c* may process the additional signaling in accordance with the LNA state and the digital linearizer state.

In some cases, UE 115-*c* may determine a mobility of UE 115-*c*, and may transmit an indication to base station 105-*b* that a state identifier associated with the one or more conditions may be cleared, continued, or updated based on the mobility of UE 115-*c*.

In some examples, UE 115-*c*, base station 105-*b*, or both may transmit a message to one or more wireless devices indicating the one or more conditions are scheduled to repeat at UE 115-*c*. The one or more wireless devices may include additional base stations, additional UEs, or both.

Figure 6:
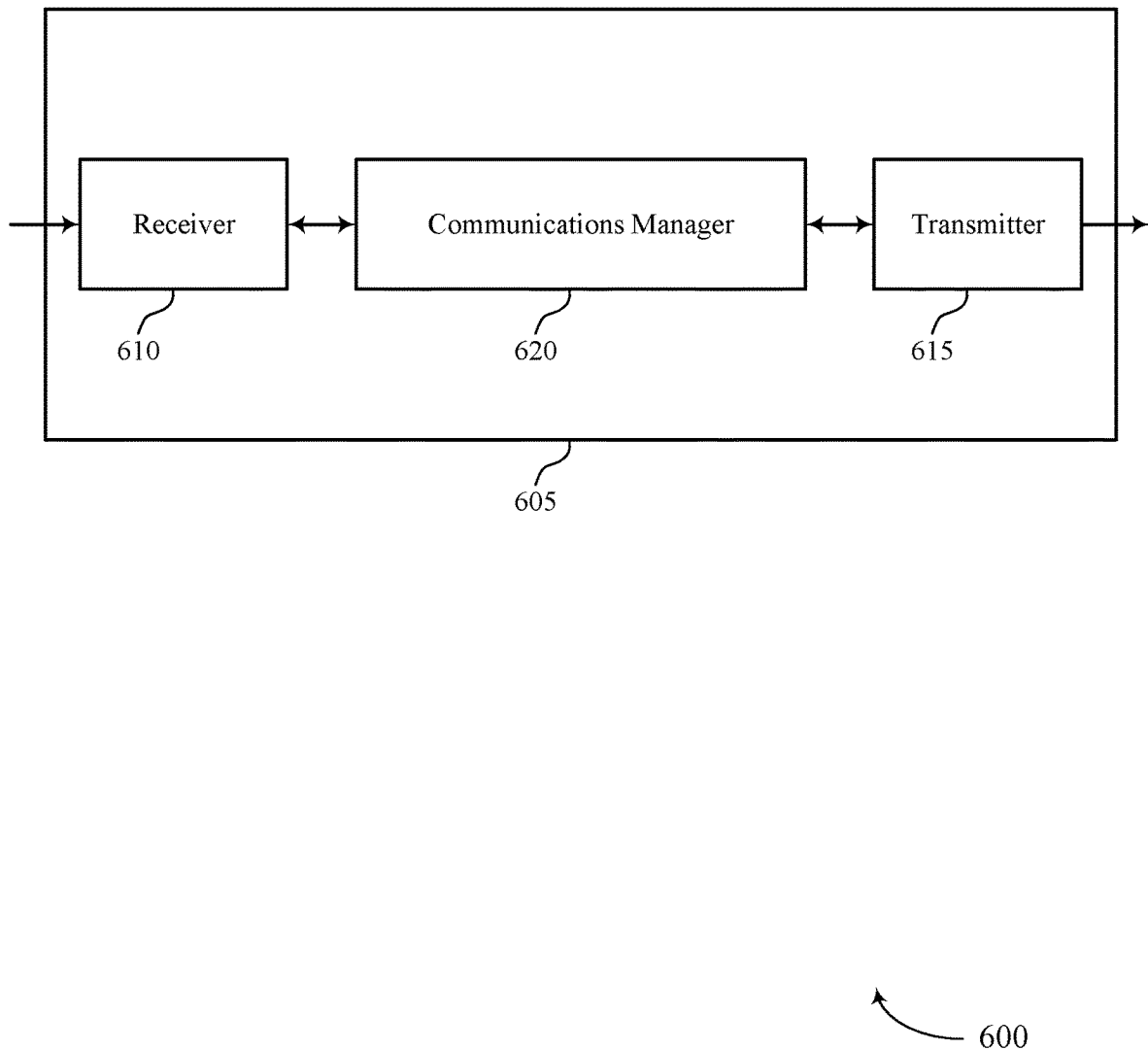
FIGS. 6 and 7 show block diagrams of devices that support LNA saturation mitigation in accordance with aspects of the present disclosure.

FIG. 6 shows a block diagram 600 of a device 605 that supports LNA saturation mitigation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to LNA saturation mitigation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to LNA saturation mitigation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of LNA saturation mitigation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving signaling from a base station, the signaling passing through one or more LNAs at the UE. The communications manager 620 may be configured as or otherwise support a means for determining that a saturation threshold is exceeded during processing of the signaling by the one or more LNAs at the UE. The communications manager 620 may be configured as or otherwise support a means for transmitting, to the base station, an indication that the saturation threshold is exceeded. The communications manager 620 may be configured as or otherwise support a means for receiving additional signaling from the base station whose content, schedule, or configuration is responsive to the indication that the saturation threshold is exceeded.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a UE to determine a saturation threshold for one or more LNAs is exceeded, and transmit an indication that the threshold is exceeded to base station, which may cause reduced processing, reduced power consumption, more efficient utilization of communication resources, and the like.

Figure 7:
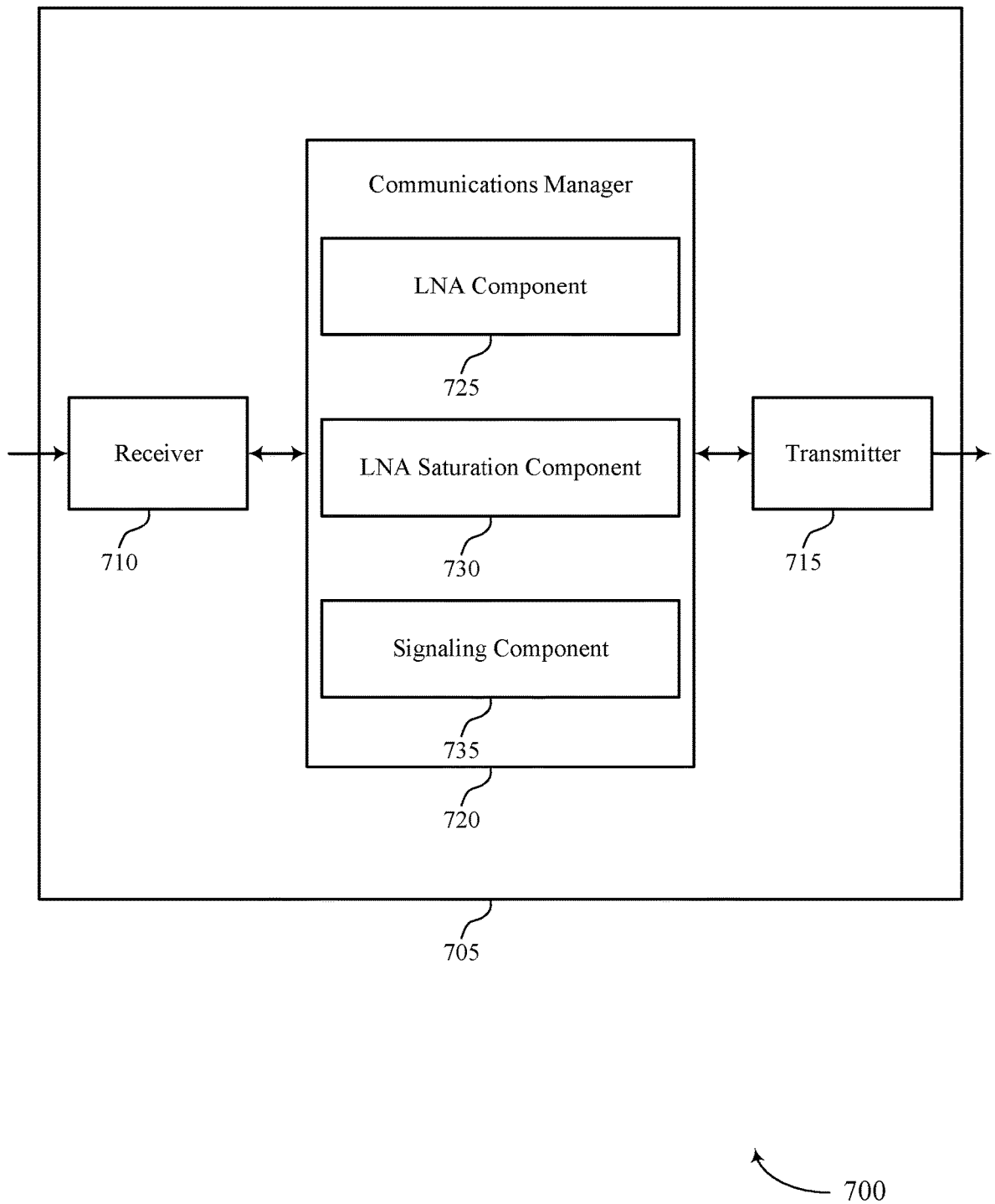

FIG. 7 shows a block diagram 700 of a device 705 that supports LNA saturation mitigation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to LNA saturation mitigation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to LNA saturation mitigation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of LNA saturation mitigation as described herein. For example, the communications manager 720 may include an LNA component 725, an LNA saturation component 730, a signaling component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The LNA component 725 may be configured as or otherwise support a means for receiving signaling from a base station, the signaling passing through one or more LNAs at the UE. The LNA saturation component 730 may be configured as or otherwise support a means for determining that a saturation threshold is exceeded during processing of the signaling by the one or more LNAs at the UE. The LNA saturation component 730 may be configured as or otherwise support a means for transmitting, to the base station, an indication that the saturation threshold is exceeded. The signaling component 735 may be configured as or otherwise support a means for receiving additional signaling from the base station whose content, schedule, or configuration is responsive to the indication that the saturation threshold is exceeded.

Figure 8:
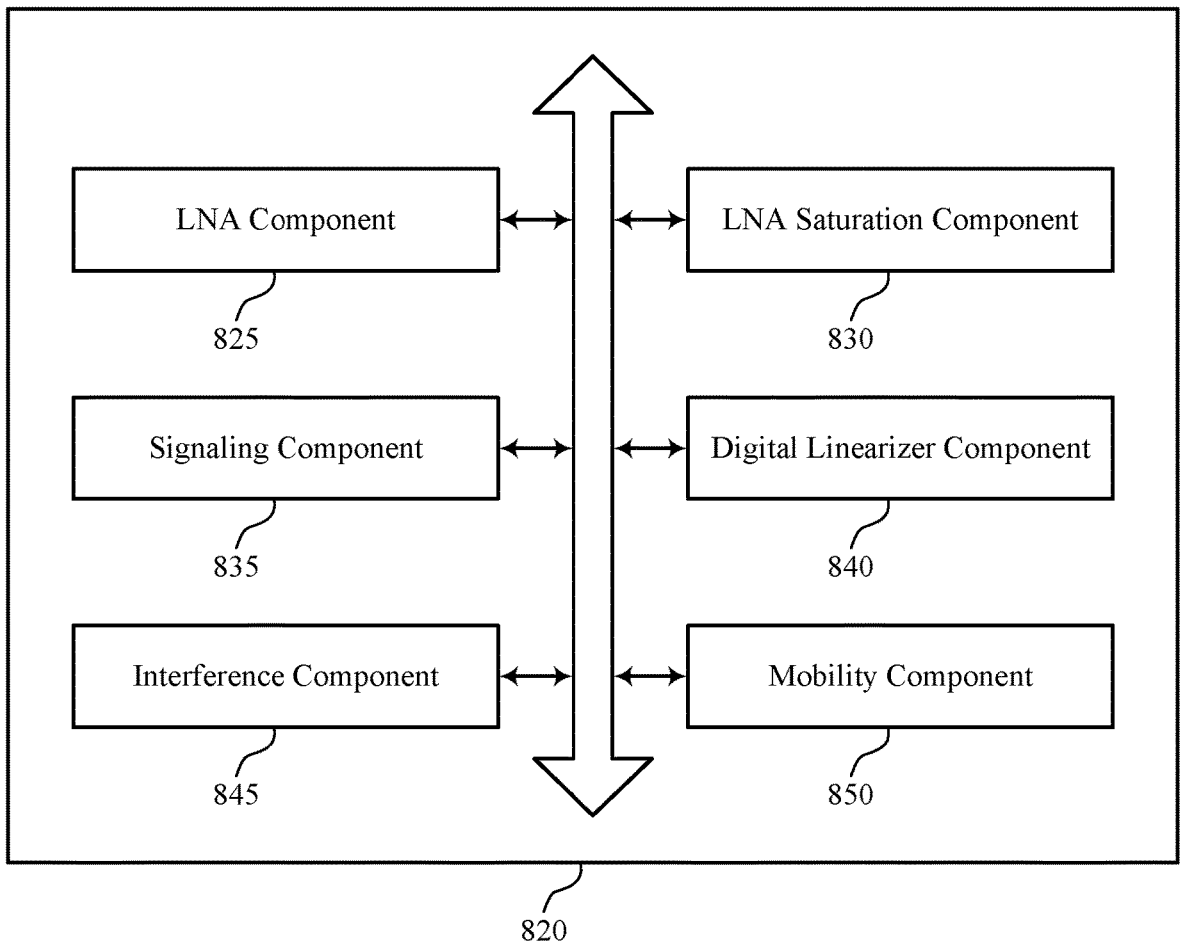
FIG. 8 shows a block diagram of a communications manager that supports LNA saturation mitigation in accordance with aspects of the present disclosure.

FIG. 8 shows a block diagram 800 of a communications manager 820 that supports LNA saturation mitigation in accordance with aspects of the present disclosure. The communications manager 820 may be an example of aspects of a communications manager 620, a communications manager 720, or both, as described herein. The communications manager 820, or various components thereof, may be an example of means for performing various aspects of LNA saturation mitigation as described herein. For example, the communications manager 820 may include an LNA component 825, an LNA saturation component 830, a signaling component 835, a digital linearizer component 840, an interference component 845, a mobility component 850, or any combination thereof. Each of these components may communicate, directly or indirectly, with one another (e.g., via one or more buses).

The communications manager 820 may support wireless communications at a UE in accordance with examples as disclosed herein. The LNA component 825 may be configured as or otherwise support a means for receiving signaling from a base station, the signaling passing through one or more LNAs at the UE. The LNA saturation component 830 may be configured as or otherwise support a means for determining that a saturation threshold is exceeded during processing of the signaling by the one or more LNAs at the UE. In some examples, the LNA saturation component 830 may be configured as or otherwise support a means for transmitting, to the base station, an indication that the saturation threshold is exceeded. The signaling component 835 may be configured as or otherwise support a means for receiving additional signaling from the base station whose content, schedule, or configuration is responsive to the indication that the saturation threshold is exceeded.

In some examples, the digital linearizer component 840 may be configured as or otherwise support a means for processing the additional signaling using a digital linearizer of a receive chain of the UE.

In some examples, the interference component 845 may be configured as or otherwise support a means for measuring a level of self-interference arising from full duplex communications while the UE was receiving the signaling. In some examples, the LNA saturation component 830 may be configured as or otherwise support a means for transmitting, to the base station, information that is indicative of one or more pairs of receive beams and transmit beams on which the UE was communicating when determining that the saturation threshold had been exceeded.

In some examples, to support transmitting the indication that the saturation threshold is exceeded, the LNA saturation component 830 may be configured as or otherwise support a means for transmitting information that is indicative of a receive beam used to receive the signaling, a receive array used to receive the signaling, a transmit beam used during full duplex communications while the UE was receiving the signaling, a transmit array identifier used during full duplex communications while the UE was receiving the signaling, a saturation level of the one or more LNAs, one or more resources during which the saturation threshold was exceeded, or a combination thereof.

In some examples, the LNA saturation component 830 may be configured as or otherwise support a means for receiving, from the base station, a message indicating that one or more conditions that previously resulted in the saturation threshold being exceeded during processing of the signaling by the one or more LNAs at the UE are scheduled to repeat.

In some examples, to support receiving the message, the LNA saturation component 830 may be configured as or otherwise support a means for receiving the message via a flag in a DCI message, an RRC message, a MAC control element (CE), or a sidelink broadcast message.

In some examples, the message includes at least one of a state identifier associated with the one or more conditions, time or frequency resource identifiers associated with resources on which an aggressor UE is scheduled to transmit, location or direction information about the aggressor UE, or a level or severity of interference or saturation expected to be caused by the aggressor UE.

In some examples, the one or more conditions with which the state identifier is associated include combinations of one or more measurement resources, measurement objects, reporting objects, a receive beam on which the UE was communicating when determining that the saturation threshold had been exceeded, or a transfer beam on which the UE was communicating when determining that the saturation threshold had been exceeded.

In some examples, the LNA saturation component 830 may be configured as or otherwise support a means for setting an LNA state for the one or more LNAs at the UE based on receiving the message. In some examples, the digital linearizer component 840 may be configured as or otherwise support a means for setting a digital linearizer state of a receive chain of the UE based on receiving the message. In some examples, the signaling component 835 may be configured as or otherwise support a means for processing the additional signaling in accordance with the LNA state and the digital linearizer state.

In some examples, the mobility component 850 may be configured as or otherwise support a means for determining a mobility of the UE. In some examples, the mobility component 850 may be configured as or otherwise support a means for transmitting, to the base station, an indication that a state identifier associated with the one or more conditions is to be cleared, continued, or updated based on the mobility of the UE.

In some examples, the LNA saturation component 830 may be configured as or otherwise support a means for searching, in response to receiving the message, for one or more beams or cells that are not associated with the one or more conditions that are scheduled to repeat.

In some examples, the LNA saturation component 830 may be configured as or otherwise support a means for transmitting, to one or more wireless devices and in response to receiving the message, a notification that is indicative that the saturation threshold is expected to be exceeded during processing of the additional signaling.

In some examples, the LNA saturation component 830 may be configured as or otherwise support a means for alerting a user of the UE, in response to receiving the message, that wireless communications of the UE are adversely affected due to the one or more conditions.

In some examples, to support transmitting the indication, the LNA saturation component 830 may be configured as or otherwise support a means for transmitting the indication in association with a quasi-colocation type reserved for use by UEs having LNAs operating in a non-linearity state.

In some examples, the interference component 845 may be configured as or otherwise support a means for measuring a level of self-interference arising from full duplex communications while the UE was receiving the signaling. In some examples, the LNA component 825 may be configured as or otherwise support a means for setting an LNA state for the one or more LNAs at the UE based on the level of self-interference. In some examples, the digital linearizer component 840 may be configured as or otherwise support a means for setting a digital linearizer state for a digital linearizer at a digital front end of a receive chain of the UE based on the level of self-interference. In some examples, the signaling component 835 may be configured as or otherwise support a means for processing the additional signaling in accordance with the LNA state and the digital linearizer state.

Figure 9:
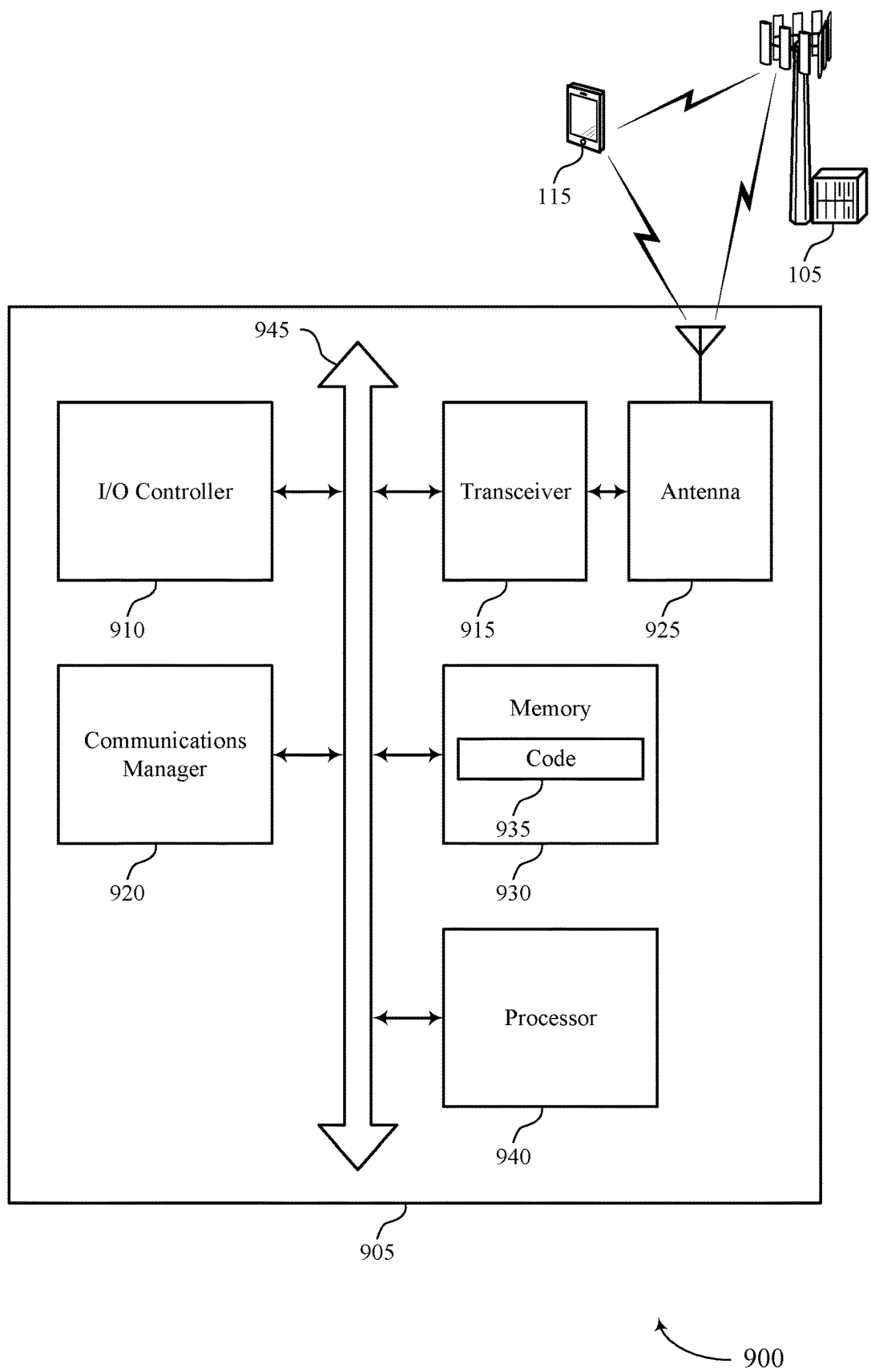
FIG. 9 shows a diagram of a system including a device that supports LNA saturation mitigation in accordance with aspects of the present disclosure.

FIG. 9 shows a diagram of a system 900 including a device 905 that supports LNA saturation mitigation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting LNA saturation mitigation). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving signaling from a base station, the signaling passing through one or more LNAs at the UE. The communications manager 920 may be configured as or otherwise support a means for determining that a saturation threshold is exceeded during processing of the signaling by the one or more LNAs at the UE. The communications manager 920 may be configured as or otherwise support a means for transmitting, to the base station, an indication that the saturation threshold is exceeded. The communications manager 920 may be configured as or otherwise support a means for receiving additional signaling from the base station whose content, schedule, or configuration is responsive to the indication that the saturation threshold is exceeded.

By including or configuring the communications manager 920 in accordance with examples as described herein, the device 905 may support techniques for a UE to determine a saturation threshold for one or more LNAs is exceeded, and transmit an indication that the threshold is exceeded to base station, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of LNA saturation mitigation as described herein, or the processor 940 and the memory 930 may be otherwise configured to perform or support such operations.

Figure 10:
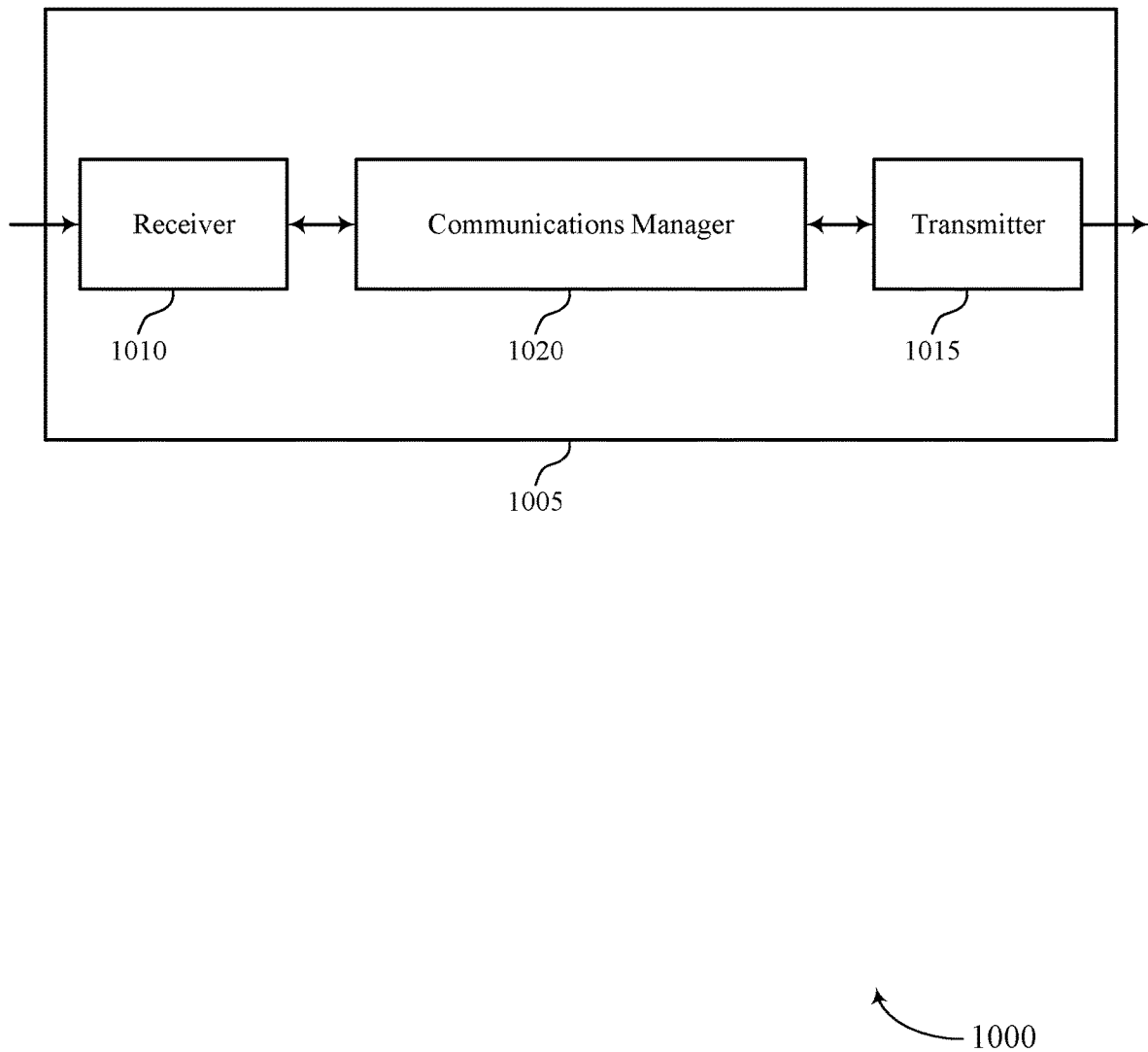
FIGS. 10 and 11 show block diagrams of devices that support LNA saturation mitigation in accordance with aspects of the present disclosure.

FIG. 10 shows a block diagram 1000 of a device 1005 that supports LNA saturation mitigation in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to LNA saturation mitigation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to LNA saturation mitigation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of LNA saturation mitigation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting signaling to a UE. The communications manager 1020 may be configured as or otherwise support a means for receiving, from the UE, an indication that a saturation threshold was exceeded during processing of the signaling by one or more LNAs at the UE. The communications manager 1020 may be configured as or otherwise support a means for transmitting additional signaling to the UE, where at least one of a content, schedule, or configuration of the additional signaling is responsive to the indication that the saturation threshold was exceeded.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for a UE to determine a saturation threshold for one or more LNAs is exceeded, and transmit an indication that the threshold is exceeded to base station, which may cause reduced processing, reduced power consumption, more efficient utilization of communication resources, and the like.

Figure 11:
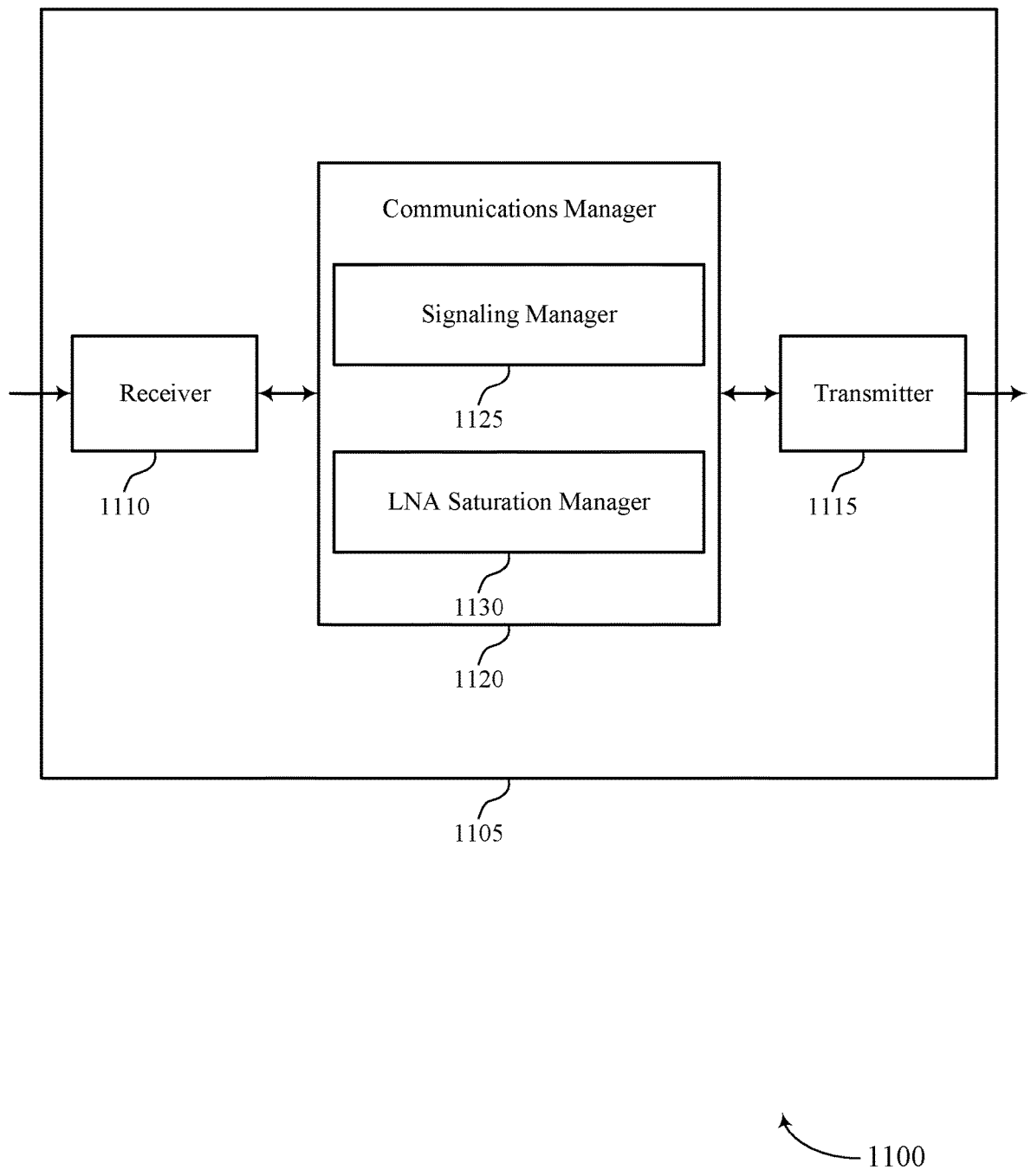

FIG. 11 shows a block diagram 1100 of a device 1105 that supports LNA saturation mitigation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to LNA saturation mitigation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to LNA saturation mitigation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of LNA saturation mitigation as described herein. For example, the communications manager 1120 may include a signaling manager 1125 an LNA saturation manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The signaling manager 1125 may be configured as or otherwise support a means for transmitting signaling to a UE. The LNA saturation manager 1130 may be configured as or otherwise support a means for receiving, from the UE, an indication that a saturation threshold was exceeded during processing of the signaling by one or more LNAs at the UE. The signaling manager 1125 may be configured as or otherwise support a means for transmitting additional signaling to the UE, where at least one of a content, schedule, or configuration of the additional signaling is responsive to the indication that the saturation threshold was exceeded.

Figure 12:
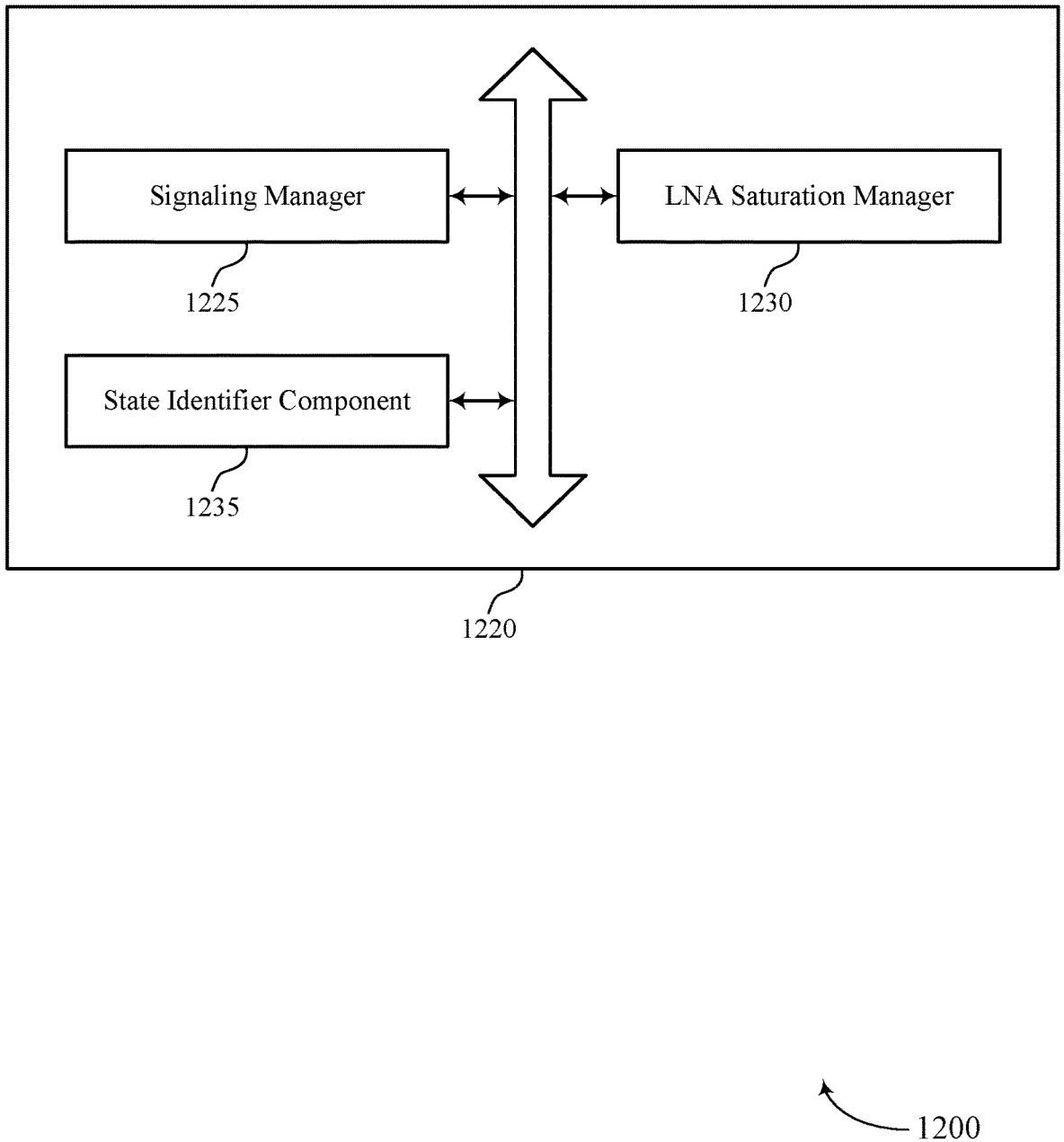
FIG. 12 shows a block diagram of a communications manager that supports LNA saturation mitigation in accordance with aspects of the present disclosure.

FIG. 12 shows a block diagram 1200 of a communications manager 1220 that supports LNA saturation mitigation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of LNA saturation mitigation as described herein. For example, the communications manager 1220 may include a signaling manager 1225, an LNA saturation manager 1230, a state identifier component 1235, or any combination thereof. Each of these components may communicate, directly or indirectly, with one another (e.g., via one or more buses).

The communications manager 1220 may support wireless communications at a base station in accordance with examples as disclosed herein. The signaling manager 1225 may be configured as or otherwise support a means for transmitting signaling to a UE. The LNA saturation manager 1230 may be configured as or otherwise support a means for receiving, from the UE, an indication that a saturation threshold was exceeded during processing of the signaling by one or more LNAs at the UE. In some examples, the signaling manager 1225 may be configured as or otherwise support a means for transmitting additional signaling to the UE, where at least one of a content, schedule, or configuration of the additional signaling is responsive to the indication that the saturation threshold was exceeded.

In some examples, the LNA saturation manager 1230 may be configured as or otherwise support a means for receiving, from the UE, information that is indicative of one or more pairs of receive beams and transmit beams on which the UE was communicating when determining that the saturation threshold had been exceeded.

In some examples, to support receiving the indication that the saturation threshold is exceeded, the LNA saturation manager 1230 may be configured as or otherwise support a means for receiving information that is indicative of a receive beam used by the UE to receive the signaling, a receive array used by the UE to receive the signaling, a transmit beam used by the UE during full duplex communications while the UE was receiving the signaling, a transmit array identifier used by the UE during full duplex communications while the UE was receiving the signaling, a saturation level of the one or more LNAs, one or more resources during which the saturation threshold was exceeded, or a combination thereof.

In some examples, the LNA saturation manager 1230 may be configured as or otherwise support a means for determining, based on the indication received from the UE that the saturation threshold had been exceeded during processing by the UE of the signaling, one or more conditions that contributed to the saturation threshold being exceeded. In some examples, the state identifier component 1235 may be configured as or otherwise support a means for associating the one or more conditions with a state identifier.

In some examples, the state identifier is associated with a cross interference level at the UE, a transmit beam used during full duplex communications by the UE, a transmit power used during full duplex communications by the UE, a transmit bandwidth used during full duplex communications by the UE, a transmit timing used during full duplex communications by the UE, a receive beam used by the UE to receive the signaling, a self-interference level caused by full duplex communications at the UE, location information corresponding to the UE, mobility information corresponding to the UE, resources corresponding to the exceeded saturation threshold, or a combination thereof.

In some examples, to support transmitting the additional signaling, the LNA saturation manager 1230 may be configured as or otherwise support a means for modifying at least one of the content, schedule, or configuration of the additional signaling based on the state identifier so as to avoid at least a portion of the one or more conditions.

In some examples, the state identifier component 1235 may be configured as or otherwise support a means for transmitting, to a network entity, a message indicating the state identifier. In some examples, the LNA saturation manager 1230 may be configured as or otherwise support a means for coordinating with the network entity to avoid at least a portion of the one or more conditions.

In some examples, the LNA saturation manager 1230 may be configured as or otherwise support a means for transmitting, to the UE, a message indicating that the one or more conditions that previously resulted in the saturation threshold being exceeded during processing of the signaling by the one or more LNAs at the UE are scheduled to repeat.

In some examples, to support transmitting the message, the LNA saturation manager 1230 may be configured as or otherwise support a means for transmitting the message via a flag in a DCI message, an RRC message, a MAC control element (CE), or a sidelink broadcast message.

In some examples, the message includes one or more of the state identifier, time or frequency resource identifiers associated with resources on which an aggressor UE is scheduled to transmit, location or direction information about the aggressor UE, or a level or severity of interference or saturation expected to be caused by the aggressor UE.

In some examples, the one or more conditions with which the state identifier is associated include combinations of one or more measurement resources, measurement objects, reporting objects, a receive beam on which the UE was communicating when determining that the saturation threshold had been exceeded, or a transfer beam on which the UE was communicating when determining that the saturation threshold had been exceeded.

In some examples, the state identifier component 1235 may be configured as or otherwise support a means for receiving, from the UE, an indication that a state identifier associated with the one or more conditions is to be cleared, continued, or updated based on a mobility of the UE.

In some examples, the LNA saturation manager 1230 may be configured as or otherwise support a means for transmitting, to one or more wireless devices, a message indicating the one or more conditions are scheduled to repeat at the UE, where the one or more wireless devices include additional base stations, additional UEs, or both.

In some examples, to support receiving the indication, the LNA saturation manager 1230 may be configured as or otherwise support a means for receiving the indication in association with a quasi-colocation type reserved for use by UEs having LNAs operating in a non-linearity state.

Figure 13:
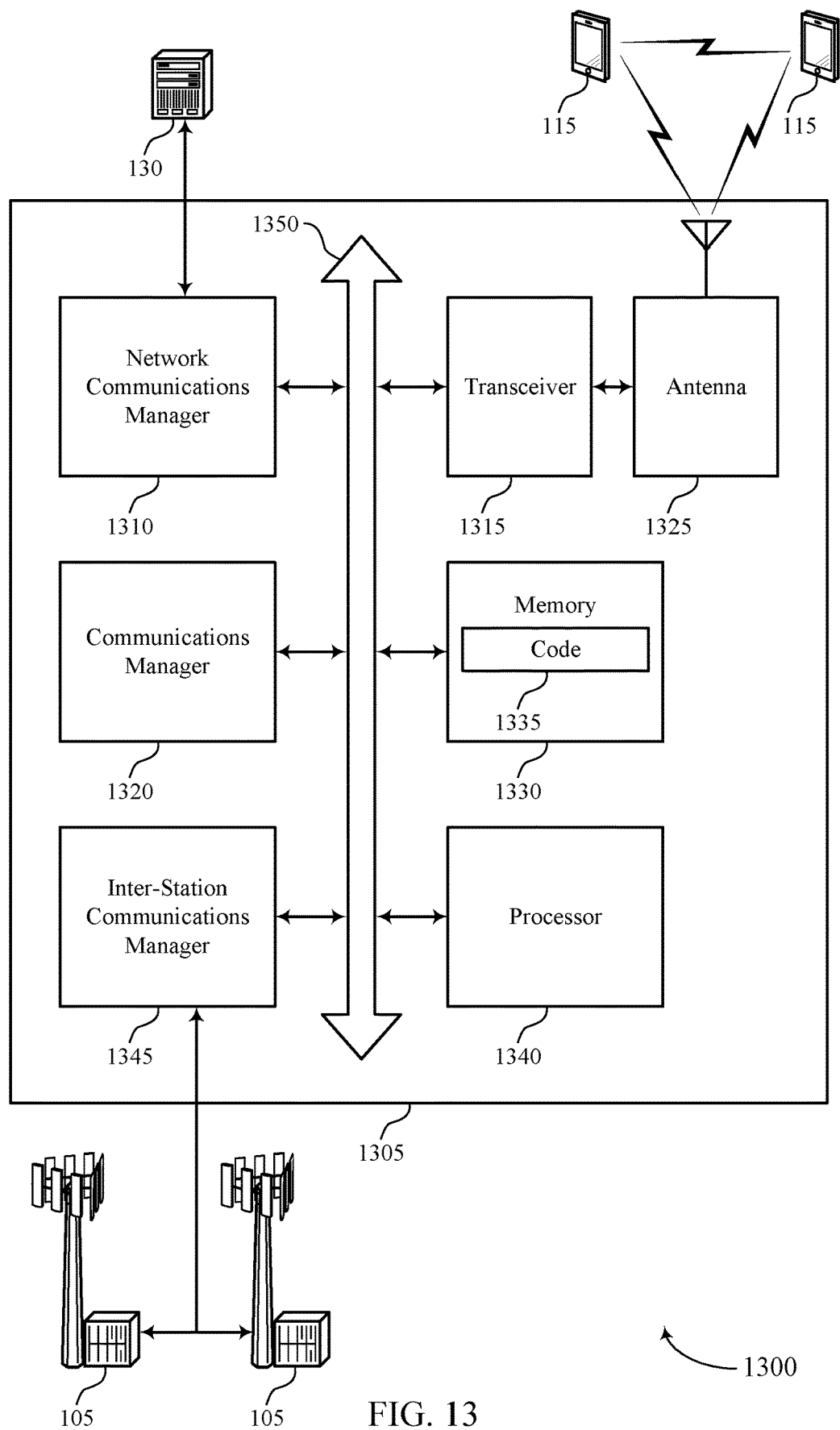
FIG. 13 shows a diagram of a system including a device that supports LNA saturation mitigation in accordance with aspects of the present disclosure.

FIG. 13 shows a diagram of a system 1300 including a device 1305 that supports LNA saturation mitigation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting LNA saturation mitigation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting signaling to a UE. The communications manager 1320 may be configured as or otherwise support a means for receiving, from the UE, an indication that a saturation threshold was exceeded during processing of the signaling by one or more LNAs at the UE. The communications manager 1320 may be configured as or otherwise support a means for transmitting additional signaling to the UE, where at least one of a content, schedule, or configuration of the additional signaling is responsive to the indication that the saturation threshold was exceeded.

By including or configuring the communications manager 1320 in accordance with examples as described herein, the device 1305 may support techniques for a UE to determine a saturation threshold is exceeded for one or more LNAs is exceeded, and transmit an indication that the threshold is exceeded to base station, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of LNA saturation mitigation as described herein, or the processor 1340 and the memory 1330 may be otherwise configured to perform or support such operations.

Figure 14:
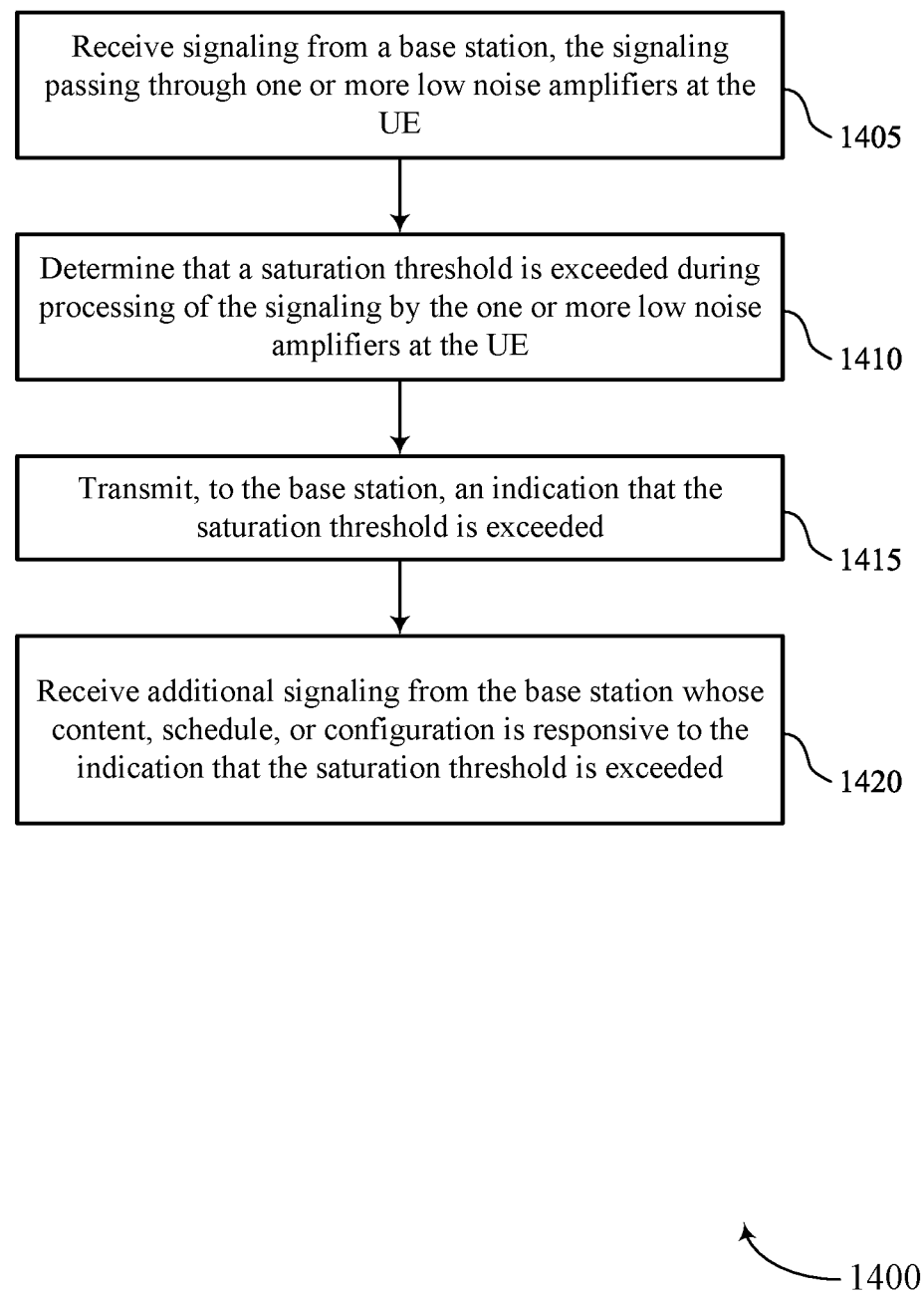
FIGS. 14 through 17 show flowcharts illustrating methods that support LNA saturation mitigation in accordance with aspects of the present disclosure.

FIG. 14 shows a flowchart illustrating a method 1400 that supports LNA saturation mitigation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving signaling from a base station, the signaling passing through one or more LNAs at the UE. The operations of 1405 may be performed in accordance with examples as disclosed herein. In some examples, aspects of the operations of 1405 may be performed by an LNA component 825 as described with reference to FIG. 8.

At 1410, the method may include determining that a saturation threshold is exceeded during processing of the signaling by the one or more LNAs at the UE. The operations of 1410 may be performed in accordance with examples as disclosed herein. In some examples, aspects of the operations of 1410 may be performed by an LNA saturation component 830 as described with reference to FIG. 8.

At 1415, the method may include transmitting, to the base station, an indication that the saturation threshold is exceeded. The operations of 1415 may be performed in accordance with examples as disclosed herein. In some examples, aspects of the operations of 1415 may be performed by an LNA saturation component 830 as described with reference to FIG. 8.

At 1420, the method may include receiving additional signaling from the base station whose content, schedule, or configuration is responsive to the indication that the saturation threshold is exceeded. The operations of 1420 may be performed in accordance with examples as disclosed herein. In some examples, aspects of the operations of 1420 may be performed by a signaling component 835 as described with reference to FIG. 8.

Figure 15:
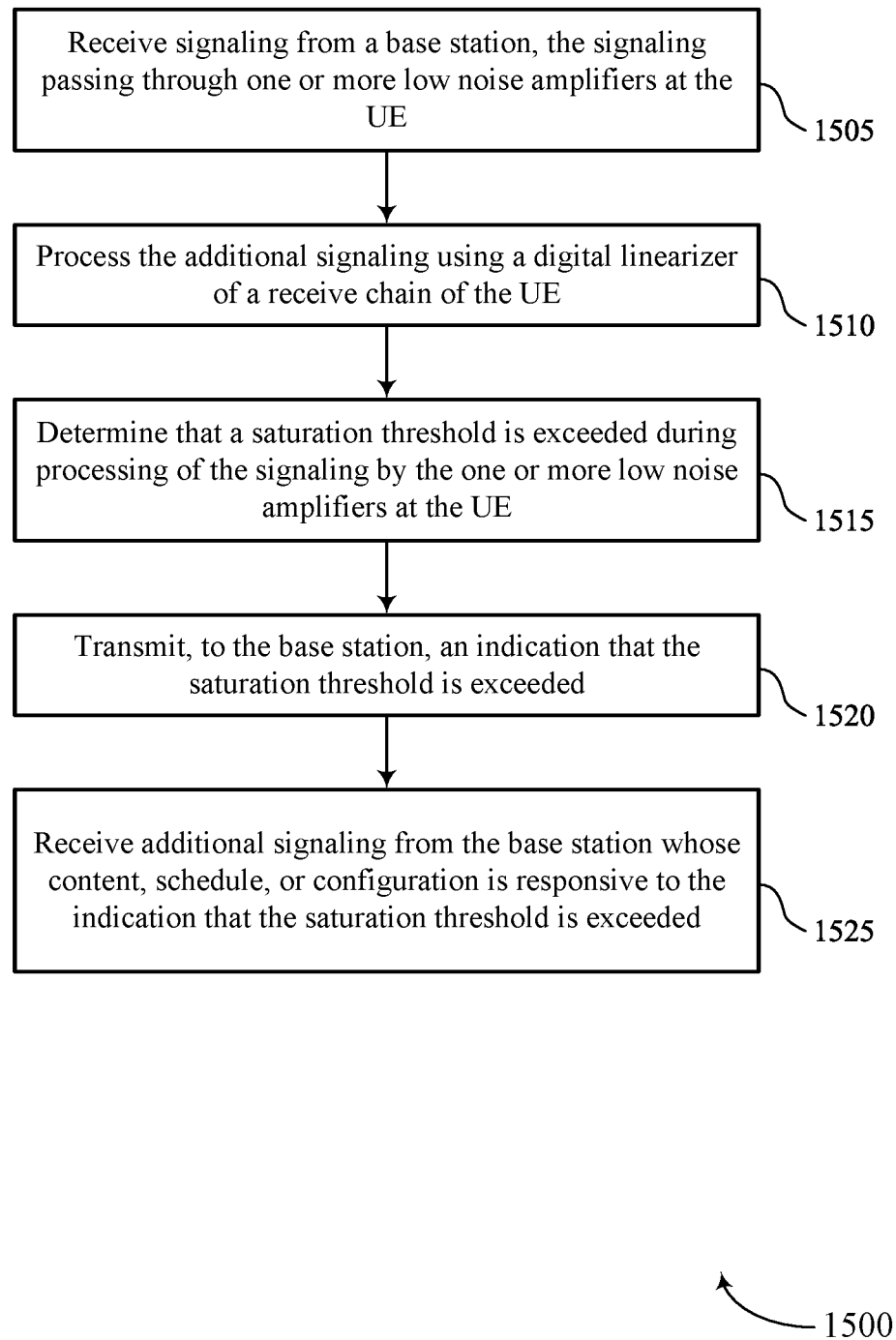

FIG. 15 shows a flowchart illustrating a method 1500 that supports LNA saturation mitigation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving signaling from a base station, the signaling passing through one or more LNAs at the UE. The operations of 1505 may be performed in accordance with examples as disclosed herein. In some examples, aspects of the operations of 1505 may be performed by an LNA component 825 as described with reference to FIG. 8.

At 1510, the method may include processing the additional signaling using a digital linearizer of a receive chain of the UE. The operations of 1510 may be performed in accordance with examples as disclosed herein. In some examples, aspects of the operations of 1510 may be performed by a digital linearizer component 840 as described with reference to FIG. 8.

At 1515, the method may include determining that a saturation threshold is exceeded during processing of the signaling by the one or more LNAs at the UE. The operations of 1515 may be performed in accordance with examples as disclosed herein. In some examples, aspects of the operations of 1515 may be performed by an LNA saturation component 830 as described with reference to FIG. 8.

At 1520, the method may include transmitting, to the base station, an indication that the saturation threshold is exceeded. The operations of 1520 may be performed in accordance with examples as disclosed herein. In some examples, aspects of the operations of 1520 may be performed by an LNA saturation component 830 as described with reference to FIG. 8.

At 1525, the method may include receiving additional signaling from the base station whose content, schedule, or configuration is responsive to the indication that the saturation threshold is exceeded. The operations of 1525 may be performed in accordance with examples as disclosed herein. In some examples, aspects of the operations of 1525 may be performed by a signaling component 835 as described with reference to FIG. 8.

Figure 16:
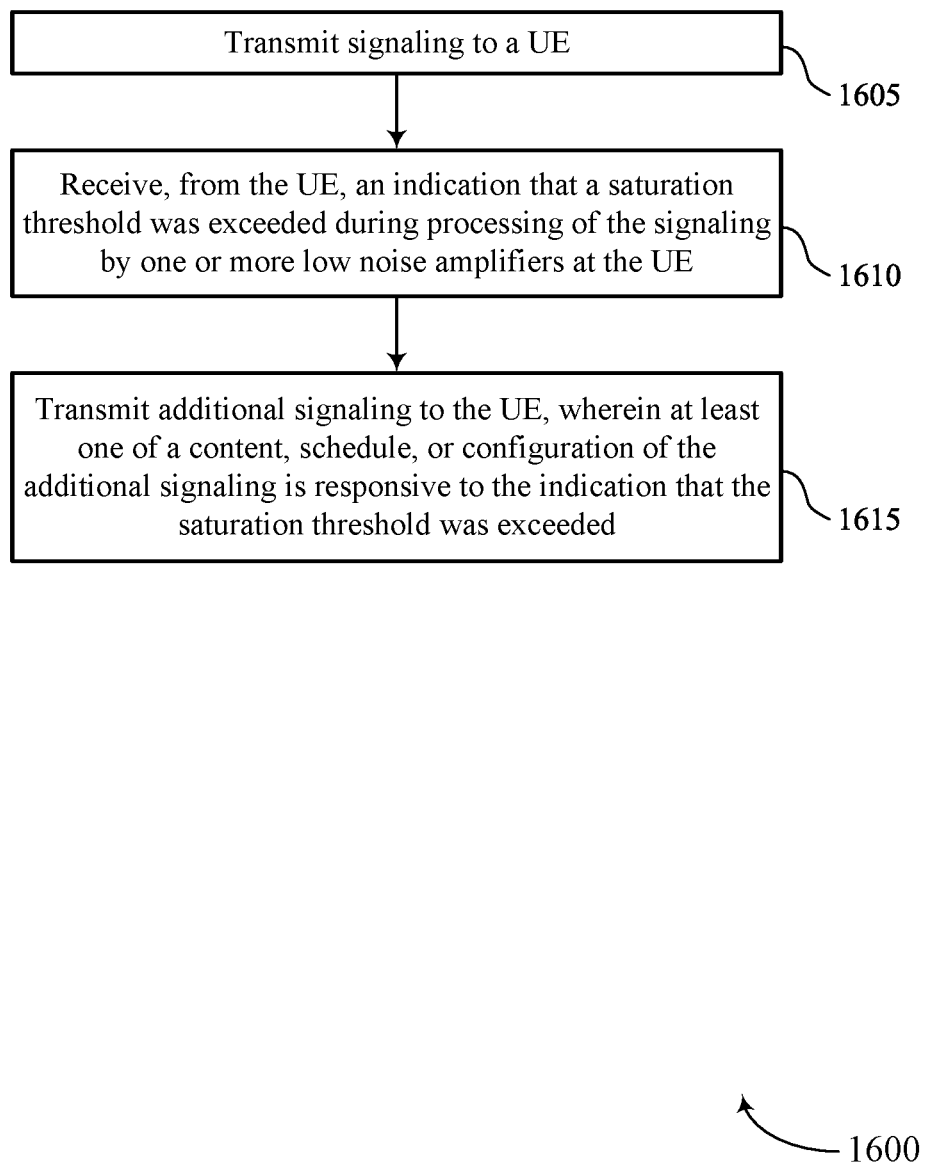

FIG. 16 shows a flowchart illustrating a method 1600 that supports LNA saturation mitigation in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting signaling to a UE. The operations of 1605 may be performed in accordance with examples as disclosed herein. In some examples, aspects of the operations of 1605 may be performed by a signaling manager 1225 as described with reference to FIG. 12.

At 1610, the method may include receiving, from the UE, an indication that a saturation threshold was exceeded during processing of the signaling by one or more LNAs at the UE. The operations of 1610 may be performed in accordance with examples as disclosed herein. In some examples, aspects of the operations of 1610 may be performed by an LNA saturation manager 1230 as described with reference to FIG. 12.

At 1615, the method may include transmitting additional signaling to the UE, where at least one of a content, schedule, or configuration of the additional signaling is responsive to the indication that the saturation threshold was exceeded. The operations of 1615 may be performed in accordance with examples as disclosed herein. In some examples, aspects of the operations of 1615 may be performed by a signaling manager 1225 as described with reference to FIG. 12.

Figure 17:
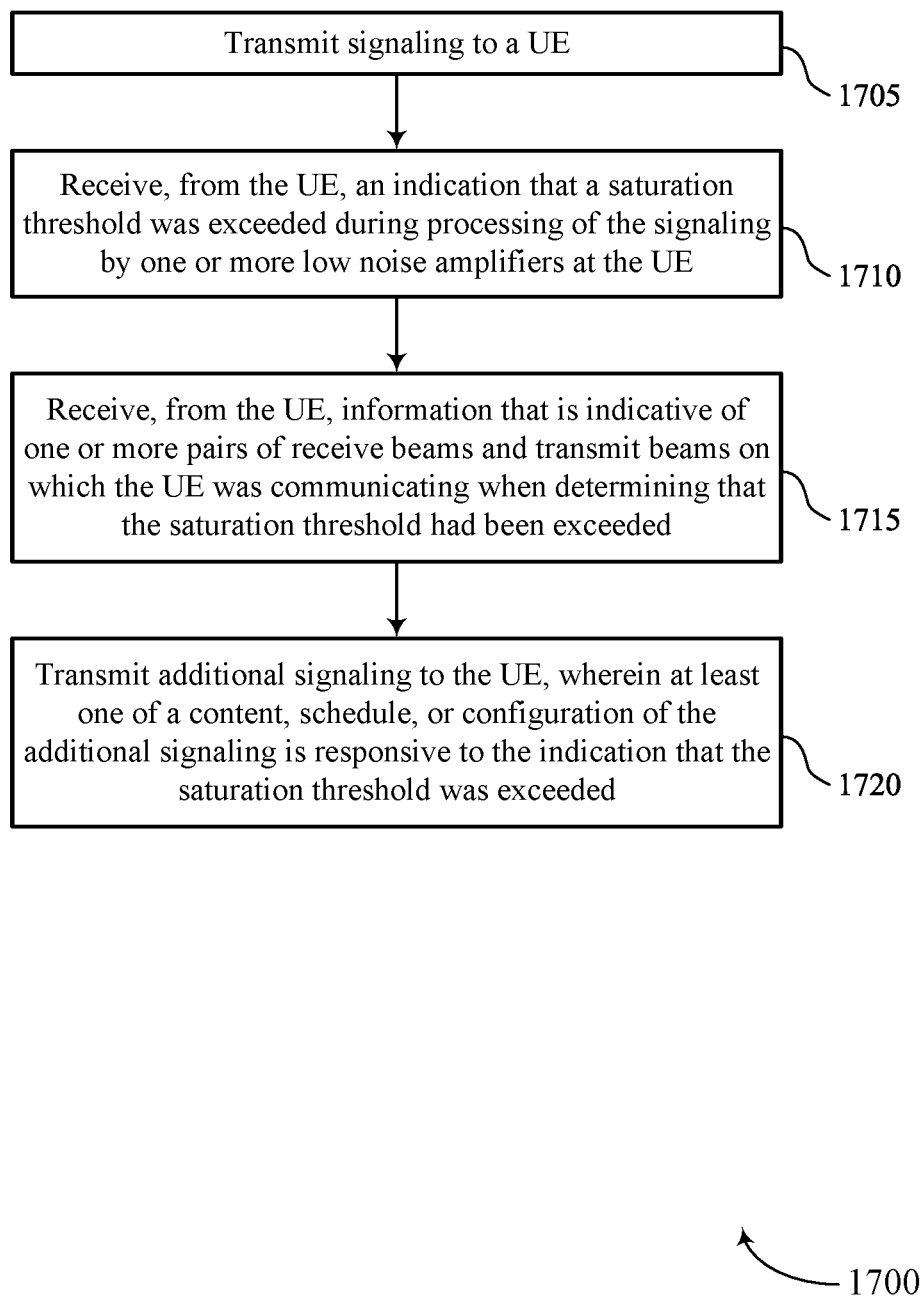

FIG. 17 shows a flowchart illustrating a method 1700 that supports LNA saturation mitigation in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting signaling to a UE. The operations of 1705 may be performed in accordance with examples as disclosed herein. In some examples, aspects of the operations of 1705 may be performed by a signaling manager 1225 as described with reference to FIG. 12.

At 1710, the method may include receiving, from the UE, an indication that a saturation threshold was exceeded during processing of the signaling by one or more LNAs at the UE. The operations of 1710 may be performed in accordance with examples as disclosed herein. In some examples, aspects of the operations of 1710 may be performed by an LNA saturation manager 1230 as described with reference to FIG. 12.

At 1715, the method may include receiving, from the UE, information that is indicative of one or more pairs of receive beams and transmit beams on which the UE was communicating when determining that the saturation threshold had been exceeded. The operations of 1715 may be performed in accordance with examples as disclosed herein. In some examples, aspects of the operations of 1715 may be performed by an LNA saturation manager 1230 as described with reference to FIG. 12.

At 1720, the method may include transmitting additional signaling to the UE, where at least one of a content, schedule, or configuration of the additional signaling is responsive to the indication that the saturation threshold was exceeded. The operations of 1720 may be performed in accordance with examples as disclosed herein. In some examples, aspects of the operations of 1720 may be performed by a signaling manager 1225 as described with reference to FIG. 12.

The following provides an overview of aspects of the present disclosure:

Aspect 1: A method for wireless communications at a UE, comprising: receiving signaling from a base station, the signaling passing through one or more low noise amplifiers at the UE; determining that a saturation threshold is exceeded during processing of the signaling by the one or more low noise amplifiers at the UE; transmitting, to the base station, an indication that the saturation threshold is exceeded; and receiving additional signaling from the base station whose content, schedule, or configuration is responsive to the indication that the saturation threshold is exceeded.

Aspect 2: The method of aspect 1, further comprising: processing the additional signaling using a digital linearizer of a receive chain of the UE.

Aspect 3: The method of any of aspects 1 through 2, further comprising: measuring a level of self-interference arising from full duplex communications while the UE was receiving the signaling; and transmitting, to the base station, information that is indicative of one or more pairs of receive beams and transmit beams on which the UE was communicating when determining that the saturation threshold had been exceeded.

Aspect 4: The method of any of aspects 1 through 3, wherein transmitting the indication that the saturation threshold is exceeded further comprises: transmitting information that is indicative of a receive beam used to receive the signaling, a receive array used to receive the signaling, a transmit beam used during full duplex communications while the UE was receiving the signaling, a transmit array identifier used during full duplex communications while the UE was receiving the signaling, a saturation level of the one or more low noise amplifiers, one or more resources during which the saturation threshold was exceeded, or a combination thereof.

Aspect 5: The method of any of aspects 1 through 4, further comprising: receiving, from the base station, a message indicating that one or more conditions that previously resulted in the saturation threshold being exceeded during processing of the signaling by the one or more low noise amplifiers at the UE are scheduled to repeat.

Aspect 6: The method of aspect 5, wherein receiving the message comprises: receiving the message via a flag in a DCI message, an RRC message, a MAC control element (CE), or a sidelink broadcast message.

Aspect 7: The method of any of aspects 5 through 6, wherein the message includes at least one of a state identifier associated with the one or more conditions, time or frequency resource identifiers associated with resources on which an aggressor UE is scheduled to transmit, location or direction information about the aggressor UE, or a level or severity of interference or saturation expected to be caused by the aggressor UE.

Aspect 8: The method of aspect 7, wherein the one or more conditions with which the state identifier is associated include combinations of one or more measurement resources, measurement objects, reporting objects, a receive beam on which the UE was communicating when determining that the saturation threshold had been exceeded, or a transfer beam on which the UE was communicating when determining that the saturation threshold had been exceeded.

Aspect 9: The method of any of aspects 5 through 8, further comprising: setting a low noise amplifier state for the one or more low noise amplifiers at the UE based at least in part on receiving the message; setting a digital linearizer state of a receive chain of the UE based at least in part on receiving the message; and processing the additional signaling in accordance with the low noise amplifier state and the digital linearizer state.

Aspect 10: The method of any of aspects 5 through 9, further comprising: determining a mobility of the UE; and transmitting, to the base station, an indication that a state identifier associated with the one or more conditions is to be cleared, continued, or updated based at least in part on the mobility of the UE.

Aspect 11: The method of any of aspects 5 through 10, further comprising: searching, in response to receiving the message, for one or more beams or cells that are not associated with the one or more conditions that are scheduled to repeat.

Aspect 12: The method of any of aspects 5 through 11, further comprising: transmitting, to one or more wireless devices and in response to receiving the message, a notification that is indicative that the saturation threshold is expected to be exceeded during processing of the additional signaling.

Aspect 13: The method of any of aspects 5 through 12, further comprising: alerting a user of the UE, in response to receiving the message, that wireless communications of the UE are adversely affected due to the one or more conditions.

Aspect 14: The method of any of aspects 1 through 13, wherein transmitting the indication comprises: transmitting the indication in association with a quasi-colocation type reserved for use by UEs having low noise amplifiers operating in a non-linearity state.

Aspect 15: The method of any of aspects 1 through 14, further comprising: measuring a level of self-interference arising from full duplex communications while the UE was receiving the signaling; setting a low noise amplifier state for the one or more low noise amplifiers at the UE based at least in part on the level of self-interference; setting a digital linearizer state for a digital linearizer at a digital front end of a receive chain of the UE based at least in part on the level of self-interference; and processing the additional signaling in accordance with the low noise amplifier state and the digital linearizer state.

Aspect 16: A method for wireless communications at a base station, comprising: transmitting signaling to a UE; receiving, from the UE, an indication that a saturation threshold was exceeded during processing of the signaling by one or more low noise amplifiers at the UE; and transmitting additional signaling to the UE, wherein at least one of a content, schedule, or configuration of the additional signaling is responsive to the indication that the saturation threshold was exceeded.

Aspect 17: The method of aspect 16, further comprising: receiving, from the UE, information that is indicative of one or more pairs of receive beams and transmit beams on which the UE was communicating when determining that the saturation threshold had been exceeded.

Aspect 18: The method of any of aspects 16 through 17, wherein receiving the indication that the saturation threshold is exceeded further comprises: receiving information that is indicative of a receive beam used by the UE to receive the signaling, a receive array used by the UE to receive the signaling, a transmit beam used by the UE during full duplex communications while the UE was receiving the signaling, a transmit array identifier used by the UE during full duplex communications while the UE was receiving the signaling, a saturation level of the one or more low noise amplifiers, one or more resources during which the saturation threshold was exceeded, or a combination thereof.

Aspect 19: The method of any of aspects 16 through 18, further comprising: determining, based at least in part on the indication received from the UE that the saturation threshold had been exceeded during processing by the UE of the signaling, one or more conditions that contributed to the saturation threshold being exceeded; and associating the one or more conditions with a state identifier.

Aspect 20: The method of aspect 19, wherein the state identifier is associated with a cross interference level at the UE, a transmit beam used during full duplex communications by the UE, a transmit power used during full duplex communications by the UE, a transmit bandwidth used during full duplex communications by the UE, a transmit timing used during full duplex communications by the UE, a receive beam used by the UE to receive the signaling, a self-interference level caused by full duplex communications at the UE, location information corresponding to the UE, mobility information corresponding to the UE, resources corresponding to the exceeded saturation threshold, or a combination thereof.

Aspect 21: The method of any of aspects 19 through 20, wherein transmitting the additional signaling further comprises: modifying at least one of the content, schedule, or configuration of the additional signaling based at least in part on the state identifier so as to avoid at least a portion of the one or more conditions.

Aspect 22: The method of any of aspects 19 through 21, further comprising: transmitting, to a network entity, a message indicating the state identifier; and coordinating with the network entity to avoid at least a portion of the one or more conditions.

Aspect 23: The method of any of aspects 19 through 22, further comprising: transmitting, to the UE, a message indicating that the one or more conditions that previously resulted in the saturation threshold being exceeded during processing of the signaling by the one or more low noise amplifiers at the UE are scheduled to repeat.

Aspect 24: The method of aspect 23, wherein transmitting the message comprises: transmitting the message via a flag in a DCI message, an RRC message, a MAC control element (CE), or a sidelink broadcast message.

Aspect 25: The method of any of aspects 23 through 24, wherein the message includes one or more of the state identifier, time or frequency resource identifiers associated with resources on which an aggressor UE is scheduled to transmit, location or direction information about the aggressor UE, or a level or severity of interference or saturation expected to be caused by the aggressor UE.

Aspect 26: The method of aspect 25, wherein the one or more conditions with which the state identifier is associated include combinations of one or more measurement resources, measurement objects, reporting objects, a receive beam on which the UE was communicating when determining that the saturation threshold had been exceeded, or a transfer beam on which the UE was communicating when determining that the saturation threshold had been exceeded.

Aspect 27: The method of any of aspects 23 through 26, further comprising: receiving, from the UE, an indication that a state identifier associated with the one or more conditions is to be cleared, continued, or updated based at least in part on a mobility of the UE.

Aspect 28: The method of any of aspects 19 through 27, further comprising: transmitting, to one or more wireless devices, a message indicating the one or more conditions are scheduled to repeat at the UE, wherein the one or more wireless devices comprise additional base stations, additional UEs, or both.

Aspect 29: The method of any of aspects 16 through 28, wherein receiving the indication comprises: receiving the indication in association with a quasi-colocation type reserved for use by UEs having low noise amplifiers operating in a non-linearity state.

Aspect 30: An apparatus for wireless communications at a UE, comprising a processor; memory coupled with the processor; and instructions stored in the memory and executable by the processor to cause the apparatus to perform a method of any of aspects 1 through 15.

Aspect 31: An apparatus for wireless communications at a UE, comprising at least one means for performing a method of any of aspects 1 through 15.

Aspect 32: A non-transitory computer-readable medium storing code for wireless communications at a UE, the code comprising instructions executable by a processor to perform a method of any of aspects 1 through 15.

Aspect 33: An apparatus for wireless communications at a base station, comprising a processor; memory coupled with the processor; and instructions stored in the memory and executable by the processor to cause the apparatus to perform a method of any of aspects 16 through 29.

Aspect 34: An apparatus for wireless communications at a base station, comprising at least one means for performing a method of any of aspects 16 through 29.

Aspect 35: A non-transitory computer-readable medium storing code for wireless communications at a base station, the code comprising instructions executable by a processor to perform a method of any of aspects 16 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      receive signaling from a base station, the signaling passing through one or more low noise amplifiers at the UE;
      determine that a saturation threshold is exceeded during processing of the signaling by the one or more low noise amplifiers at the UE;
      transmit, to the base station, an indication that the saturation threshold is exceeded; and
      receive additional signaling from the base station whose content, schedule, or configuration is responsive to the indication that the saturation threshold is exceeded.

2. The apparatus of claim 1, wherein the instructions are further executable by the processor to cause the apparatus to:
   process the additional signaling using a digital linearizer of a receive chain of the UE.

3. The apparatus of claim 1, wherein the instructions are further executable by the processor to cause the apparatus to:
   measure a level of self-interference arising from full duplex communications while the UE was receiving the signaling; and
   transmit, to the base station, information that is indicative of one or more pairs of receive beams and transmit beams on which the UE was communicating when determining that the saturation threshold had been exceeded.

4. The apparatus of claim 1, wherein the instructions to transmit the indication that the saturation threshold is exceeded are further executable by the processor to cause the apparatus to:
   transmit information that is indicative of a receive beam used to receive the signaling, a receive array used to receive the signaling, a transmit beam used during full duplex communications while the UE was receiving the signaling, a transmit array identifier used during full duplex communications while the UE was receiving the signaling, a saturation level of the one or more low noise amplifiers, one or more resources during which the saturation threshold was exceeded, or a combination thereof.

5. The apparatus of claim 1, wherein the instructions are further executable by the processor to cause the apparatus to:
   receive, from the base station, a message indicating that one or more conditions that previously resulted in the saturation threshold being exceeded during processing of the signaling by the one or more low noise amplifiers at the UE are scheduled to repeat.

6. The apparatus of claim 5, wherein the instructions to receive the message are executable by the processor to cause the apparatus to:
   receive the message via a flag in a downlink control information (DCI) message, a radio resource control (RRC) message, a media access control (MAC) control element (CE), or a sidelink broadcast message.

7. The apparatus of claim 5, wherein the message includes at least one of a state identifier associated with the one or more conditions, time or frequency resource identifiers associated with resources on which an aggressor UE is scheduled to transmit, location or direction information about the aggressor UE, or a level or severity of interference or saturation expected to be caused by the aggressor UE.

8. The apparatus of claim 7, wherein the one or more conditions with which the state identifier is associated include combinations of one or more measurement resources, measurement objects, reporting objects, a receive beam on which the UE was communicating when determining that the saturation threshold had been exceeded, or a transfer beam on which the UE was communicating when determining that the saturation threshold had been exceeded.

9. The apparatus of claim 5, wherein the instructions are further executable by the processor to cause the apparatus to:
set a low noise amplifier state for the one or more low noise amplifiers at the UE based at least in part on receiving the message;
set a digital linearizer state of a receive chain of the UE based at least in part on receiving the message; and
process the additional signaling in accordance with the low noise amplifier state and the digital linearizer state.

10. The apparatus of claim 5, wherein the instructions are further executable by the processor to cause the apparatus to:
determine a mobility of the UE; and
transmit, to the base station, an indication that a state identifier associated with the one or more conditions is to be cleared, continued, or updated based at least in part on the mobility of the UE.

11. The apparatus of claim 5, wherein the instructions are further executable by the processor to cause the apparatus to:
searching, in response to receive the message, for one or more beams or cells that are not associated with the one or more conditions that are scheduled to repeat.

12. The apparatus of claim 5, wherein the instructions are further executable by the processor to cause the apparatus to:
transmit, to one or more wireless devices and in response to receiving the message, a notification that is indicative that the saturation threshold is expected to be exceeded during processing of the additional signaling.

13. The apparatus of claim 5, wherein the instructions are further executable by the processor to cause the apparatus to:
alert a user of the UE, in response to receiving the message, that wireless communications of the UE are adversely affected due to the one or more conditions.

14. The apparatus of claim 1, wherein the instructions to transmit the indication are executable by the processor to cause the apparatus to:
transmit the indication in association with a quasi-colocation type reserved for use by UEs having low noise amplifiers operating in a non-linearity state.

15. The apparatus of claim 1, wherein the instructions are further executable by the processor to cause the apparatus to:
measure a level of self-interference arising from full duplex communications while the UE was receiving the signaling;
set a low noise amplifier state for the one or more low noise amplifiers at the UE based at least in part on the level of self-interference;
set a digital linearizer state for a digital linearizer at a digital front end of a receive chain of the UE based at least in part on the level of self-interference; and
process the additional signaling in accordance with the low noise amplifier state and the digital linearizer state.

16. An apparatus for wireless communications at a base station, comprising:
a processor;
memory coupled with the processor; and
instructions stored in the memory and executable by the processor to cause the apparatus to:
transmit signaling to a user equipment (UE);
receive, from the UE, an indication that a saturation threshold was exceeded during processing of the signaling by one or more low noise amplifiers at the UE; and
transmit additional signaling to the UE, wherein at least one of a content, schedule, or configuration of the additional signaling is responsive to the indication that the saturation threshold was exceeded.

17. The apparatus of claim 16, wherein the instructions are further executable by the processor to cause the apparatus to:
receive, from the UE, information that is indicative of one or more pairs of receive beams and transmit beams on which the UE was communicating when determining that the saturation threshold had been exceeded.

18. The apparatus of claim 16, wherein the instructions to receive the indication that the saturation threshold is exceeded are further executable by the processor to cause the apparatus to:
receive information that is indicative of a receive beam used by the UE to receive the signaling, a receive array used by the UE to receive the signaling, a transmit beam used by the UE during full duplex communications while the UE was receiving the signaling, a transmit array identifier used by the UE during full duplex communications while the UE was receiving the signaling, a saturation level of the one or more low noise amplifiers, one or more resources during which the saturation threshold was exceeded, or a combination thereof.

19. The apparatus of claim 16, wherein the instructions are further executable by the processor to cause the apparatus to:
determine, based at least in part on the indication received from the UE that the saturation threshold had been exceeded during processing by the UE of the signaling, one or more conditions that contributed to the saturation threshold being exceeded; and
associate the one or more conditions with a state identifier.

20. The apparatus of claim 19, wherein the state identifier is associated with a cross interference level at the UE, a transmit beam used during full duplex communications by the UE, a transmit power used during full duplex communications by the UE, a transmit bandwidth used during full duplex communications by the UE, a transmit timing used during full duplex communications by the UE, a receive beam used by the UE to receive the signaling, a self-interference level caused by full duplex communications at the UE, location information corresponding to the UE, mobility information corresponding to the UE, resources corresponding to the exceeded saturation threshold, or a combination thereof.

21. The apparatus of claim 19, wherein the instructions to transmit the additional signaling are further executable by the processor to cause the apparatus to:
modify at least one of the content, schedule, or configuration of the additional signaling based at least in part on the state identifier so as to avoid at least a portion of the one or more conditions.

22. The apparatus of claim 19, wherein the instructions are further executable by the processor to cause the apparatus to:
transmit, to a network entity, a message indicating the state identifier; and coordinate with the network entity to avoid at least a portion of the one or more conditions.

23. The apparatus of claim 19, wherein the instructions are further executable by the processor to cause the apparatus to:

transmit, to the UE, a message indicating that the one or more conditions that previously resulted in the saturation threshold being exceeded during processing of the signaling by the one or more low noise amplifiers at the UE are scheduled to repeat.

24. The apparatus of claim 23, wherein the instructions to transmit the message are executable by the processor to cause the apparatus to:

transmit the message via a flag in a downlink control information (DCI) message, a radio resource control (RRC) message, a media access control (MAC) control element (CE), or a sidelink broadcast message.

25. The apparatus of claim 23, wherein the message includes one or more of the state identifier, time or frequency resource identifiers associated with resources on which an aggressor UE is scheduled to transmit, location or direction information about the aggressor UE, or a level or severity of interference or saturation expected to be caused by the aggressor UE.

26. The apparatus of claim 23, wherein the instructions are further executable by the processor to cause the apparatus to:

receive, from the UE, an indication that a state identifier associated with the one or more conditions is to be cleared, continued, or updated based at least in part on a mobility of the UE.

27. The apparatus of claim 19, wherein the instructions are further executable by the processor to cause the apparatus to:

transmit, to one or more wireless devices, a message indicating the one or more conditions are scheduled to repeat at the UE, wherein the one or more wireless devices comprise additional base stations, additional UEs, or both.

28. The apparatus of claim 16, wherein the instructions to receive the indication are executable by the processor to cause the apparatus to:

receive the indication in association with a quasi-colocation type reserved for use by UEs having low noise amplifiers operating in a non-linearity state.

29. A method for wireless communications at a user equipment (UE), comprising:

receiving signaling from a base station, the signaling passing through one or more low noise amplifiers at the UE;

determining that a saturation threshold is exceeded during processing of the signaling by the one or more low noise amplifiers at the UE;

transmitting, to the base station, an indication that the saturation threshold is exceeded; and receiving additional signaling from the base station whose content, schedule, or configuration is responsive to the indication that the saturation threshold is exceeded.

30. A method for wireless communications at a base station, comprising:

transmitting signaling to a user equipment (UE);

receiving, from the UE, an indication that a saturation threshold was exceeded during processing of the signaling by one or more low noise amplifiers at the UE; and transmitting additional signaling to the UE, wherein at least one of a content, schedule, or configuration of the additional signaling is responsive to the indication that the saturation threshold was exceeded.

* * * * *